United States Patent
Adachi et al.

(10) Patent No.: US 9,983,671 B2
(45) Date of Patent: May 29, 2018

(54) ELECTRONIC DEVICE

(71) Applicant: Panasonic Intellectual Property Management Co., Ltd., Osaka (JP)

(72) Inventors: Yusuke Adachi, Osaka (JP); Yoshifumi Hirose, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 249 days.

(21) Appl. No.: 14/948,576

(22) Filed: Nov. 23, 2015

(65) Prior Publication Data

US 2016/0132117 A1 May 12, 2016

Related U.S. Application Data

(63) Continuation of application No. PCT/JP2014/005151, filed on Oct. 9, 2014.

(30) Foreign Application Priority Data

Oct. 25, 2013 (JP) .................... 2013-222365

(51) Int. Cl.
*G06F 3/01* (2006.01)
*G06F 3/041* (2006.01)
(Continued)

(52) U.S. Cl.
CPC ............ *G06F 3/016* (2013.01); *G06F 1/1626* (2013.01); *G06F 1/1643* (2013.01); *G06F 3/041* (2013.01); *G06F 3/0416* (2013.01); *G06F 3/0488* (2013.01)

(58) Field of Classification Search
CPC .......... G06F 3/016; G06F 2203/013–2203/015
See application file for complete search history.

(56) References Cited

U.S. PATENT DOCUMENTS 5,761,087 A   6/1998 Yoshimura et al.
8,970,534 B2 * 3/2015 Adachi ................ G06F 3/016
                                                        310/345
(Continued)

FOREIGN PATENT DOCUMENTS

JP     09-190272 A    7/1997
JP    2007-034938 A   2/2007
(Continued)

OTHER PUBLICATIONS

International Search Report for corresponding International Application No. PCT/JP2014/005151 dated Dec. 9, 2014.

*Primary Examiner* — Patrick F Marinelli
(74) *Attorney, Agent, or Firm* — Renner, Otto, Boisselle & Sklar, LLP

(57) ABSTRACT

An electronic device 100 according to one embodiment includes: a panel 101; vibrators 102 that vibrates the panel 101; and a vibration controller 109 that controls the vibrators 102 so that when positions of the panel 101 are simultaneously touched by the user, a vibration at a first touch position of the touch positions is greater than a vibration of a second touch position of the touch positions. The vibrators 102 include a first and a second vibrator 102. Where a distance between first touch position and the first vibrator 102 is equal to a distance between second touch position and the first vibrator 102, a transfer characteristic of vibration of the panel 101 between the first vibrator 102 and the first touch position is different from a transfer characteristic of vibration of the panel 101 between the first vibrator 102 and the second touch position.

20 Claims, 19 Drawing Sheets

(51) Int. Cl.
*G06F 3/0488* (2013.01)
*G06F 1/16* (2006.01)

(56) References Cited

U.S. PATENT DOCUMENTS

| | | | |
|---|---|---|---|
| 9,117,994 B2* | 8/2015 | Adachi | G06F 3/016 |
| 9,348,414 B2* | 5/2016 | Kagayama | G06F 3/016 |
| 9,356,225 B2* | 5/2016 | Park | H01L 41/0973 |
| 9,400,556 B2* | 7/2016 | Adachi | G06F 3/016 |
| 9,459,713 B2* | 10/2016 | Okumura | G06F 3/041 |
| 9,477,306 B1* | 10/2016 | Hebenstreit | G09B 21/003 |
| 9,489,810 B2* | 11/2016 | Tissot | G05G 5/06 |
| 9,535,514 B2* | 1/2017 | Lim | G06F 3/0416 |
| 2007/0035526 A1 | 2/2007 | Takenaka et al. | |
| 2008/0093130 A1* | 4/2008 | Lee | G06F 3/04886 |
| | | | 178/18.01 |
| 2009/0085878 A1 | 4/2009 | Heubel et al. | |
| 2009/0102805 A1 | 4/2009 | Meijer et al. | |
| 2009/0243817 A1* | 10/2009 | Son | G06F 3/0418 |
| | | | 340/407.2 |
| 2010/0156814 A1* | 6/2010 | Weber | G06F 3/016 |
| | | | 345/173 |
| 2010/0156818 A1* | 6/2010 | Burrough | G06F 3/016 |
| | | | 345/173 |
| 2011/0090167 A1 | 4/2011 | Harris | |
| 2011/0102341 A1* | 5/2011 | Imai | G06F 1/1626 |
| | | | 345/173 |
| 2012/0015002 A1* | 1/2012 | Ali | C03C 17/30 |
| | | | 424/400 |
| 2012/0151760 A1* | 6/2012 | Steijner | B24B 1/00 |
| | | | 29/831 |
| 2013/0009893 A1* | 1/2013 | Okumura | G06F 3/041 |
| | | | 345/173 |
| 2013/0113760 A1* | 5/2013 | Gossweiler | G06F 3/0433 |
| | | | 345/177 |
| 2013/0229384 A1* | 9/2013 | Adachi | G06F 3/016 |
| | | | 345/174 |
| 2013/0257776 A1* | 10/2013 | Tissot | G05G 5/06 |
| | | | 345/173 |
| 2013/0271412 A1* | 10/2013 | Adachi | G06F 3/016 |
| | | | 345/173 |
| 2013/0328447 A1* | 12/2013 | Park | H01L 41/0973 |
| | | | 310/332 |
| 2014/0028157 A1* | 1/2014 | Adachi | G06F 3/016 |
| | | | 310/366 |
| 2014/0132568 A1* | 5/2014 | Hirose | G06F 3/016 |
| | | | 345/175 |
| 2014/0306914 A1* | 10/2014 | Kagayama | G06F 3/016 |
| | | | 345/173 |
| 2015/0175812 A1* | 6/2015 | Ali | C03C 17/30 |
| | | | 428/447 |
| 2015/0323995 A1* | 11/2015 | Lim | G06F 3/0416 |
| | | | 345/174 |
| 2015/0338883 A1* | 11/2015 | Farahani | G06F 1/1656 |
| | | | 361/679.1 |
| 2016/0132117 A1* | 5/2016 | Adachi | G06F 3/0488 |
| | | | 345/173 |
| 2016/0259414 A1* | 9/2016 | Fujii | G06F 3/016 |

FOREIGN PATENT DOCUMENTS

| | | |
|---|---|---|
| JP | 2010-055282 A | 3/2010 |
| JP | 2010-541071 A | 12/2010 |
| JP | 2011-501298 A | 1/2011 |
| JP | 2011-527791 A | 11/2011 |
| JP | 2013-156684 A | 8/2013 |
| WO | WO 2013081119 A1 * | 6/2013 ............ C03B 7/14 |
| WO | WO 2013/161163 A1 | 10/2013 |

* cited by examiner

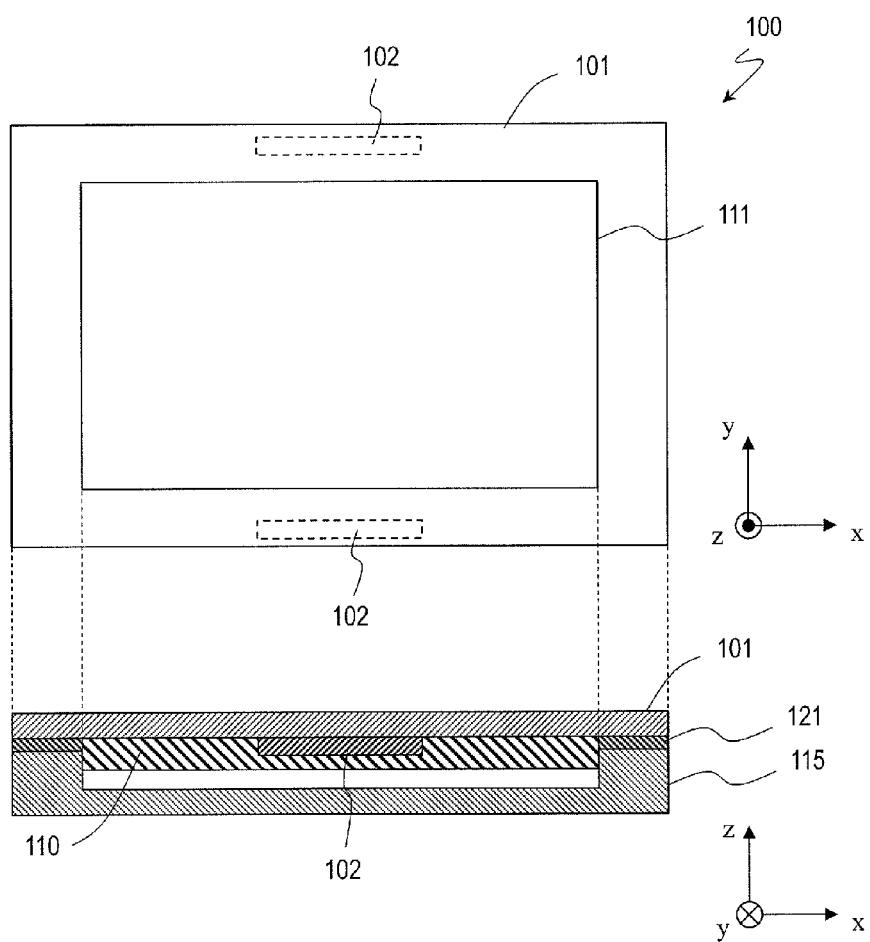

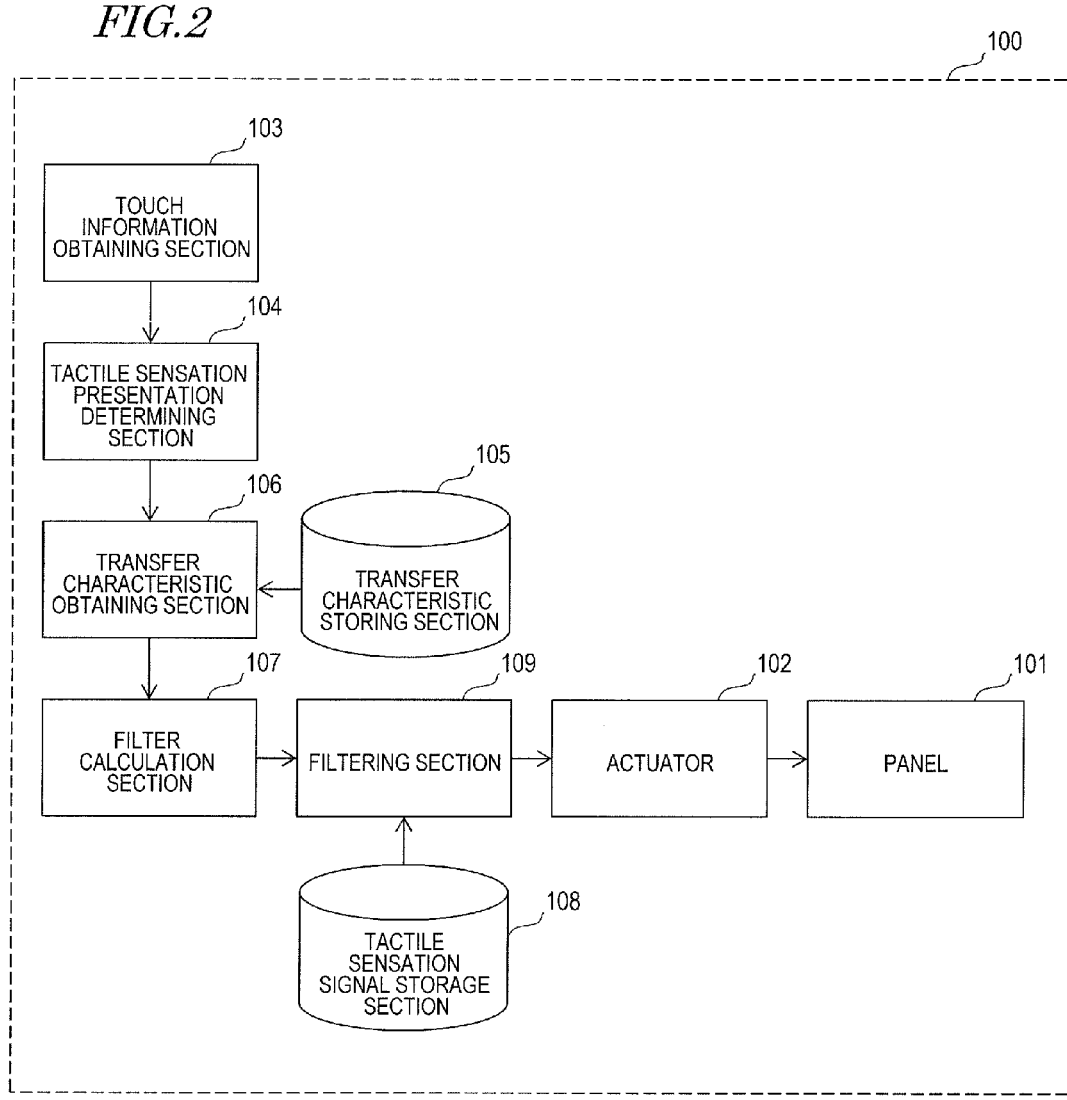

ELECTRONIC DEVICE

This is a continuation of International Application No. PCT/JP2014/005151, with an international filing date of Oct. 9, 2014, which claims priority of Japanese Patent Application No. 2013-222365, filed on Oct. 25, 2013, the contents of which are hereby incorporated by reference.

BACKGROUND

1. Technical Field

The present disclosure relates to an electronic device having a tactile sensation presenting function of presenting a tactile sensation in response to a user's operation.

2. Description of the Related Art

There are conventional public terminal devices with a touch panel (e.g., ATMs or automatic ticket vending machines, etc.). Personal devices with a touch panel (e.g., tablet PCs or smartphones, etc.) have also been increasing.

A touch panel is an input device for detecting a touch on the panel as an input. Typically, a touch panel includes a liquid crystal display or an organic EL display, etc. In such a case, a touch panel is referred to also as a touch display or a touch screen. For example, a touch panel detects a user's touch on a GUI object (e.g., a button) displayed in the display area.

A user interface using such a touch panel is advantageous in that it is highly flexible in terms of the arrangement of GUI objects. However, user interfaces using touch panels provide a weaker sensational feedback when a button is pressed, as compared with a user interface using conventional mechanical buttons. Therefore, there is a problem in that when a user touches the touch panel, it is difficult for the user to know whether or not the touch has been detected properly. In order to solve this problem, a method has been proposed in the art, in which a tactile sensation (haptics) is presented by vibrating the touch panel in response to a touch (e.g., Patent Document No. 1 (Japanese National Phase PCT Laid-Open Publication No. 2011-527791)).

Patent Document No. 1 (Japanese National Phase PCT Laid-Open Publication No. 2011-527791) discloses a tactile multi-touch technique in which the vibration is maximized at a particular one of positions touched by fingers of a user while reducing or minimizing the vibration at the other ones of the positions.

This technique is directed to a tactile touch panel that gives a tactile sensation to a user by flexural vibrations generated from a plurality of vibration sources, in which a tactile sensation can be generated only on a particular one of a plurality of fingers of a user touching the panel by maximizing the amplitude of a flexural wave at a particular position while reducing or minimizing the amplitude at the other positions by controlling the plurality of vibration sources.

SUMMARY

The present disclosure provides an electronic device for presenting a tactile sensation in response to a multi-touch operation.

An electronic device according to one embodiment of the present disclosure includes: a panel touched by a user; a plurality of vibrators for vibrating the panel; and a vibration controller for controlling the plurality of vibrators so that when a plurality of positions of the panel are simultaneously touched by the user, a vibration at a first touch position of the plurality of touch positions is greater than a vibration of a second touch position of the plurality of touch positions. The plurality of vibrators include a first and a second vibrator. Where a distance between the first touch position and the first vibrator is equal to a distance between the second touch position and the first vibrator, a transfer characteristic of vibration of the panel between the first vibrator and the first touch position is different from a transfer characteristic of vibration of the panel between the first vibrator and the second touch position.

An electronic device according to one embodiment of the present invention includes: a panel touched by a user; a plurality of vibrators for vibrating the panel; and a vibration controller for controlling the plurality of vibrators so that when a plurality of positions of the panel are simultaneously touched by the user, a vibration at a first touch position of the plurality of touch positions is greater than a vibration of a second touch position of the plurality of touch positions. The plurality of vibrators include a first and a second vibrator. Where a distance between the first touch position and the first vibrator is equal to a distance between the first touch position and the second vibrator, a transfer characteristic of vibration of the panel between the first vibrator and the first touch position is different from a transfer characteristic of vibration of the panel between the second vibrator and the first touch position.

With an electronic device according to one embodiment of the present disclosure, the transfer function from the vibration source can be varied between any two points on the panel, and the vibration amplitude can be varied therebetween.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF DRAWINGS

FIG. 1(a) and FIG. 1(b) are diagrams each showing an electronic device according to an embodiment.

FIG. 2 is a diagram showing an electronic device according to an embodiment.

DETAILED DESCRIPTION

Figure 3A:
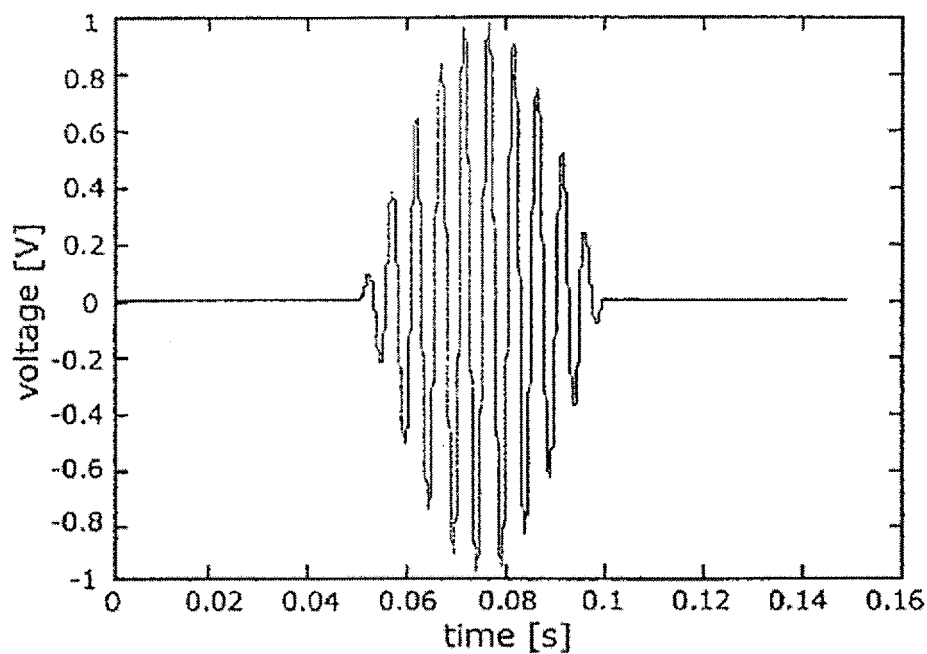
FIG. 3A and FIG. 3B are graphs each showing a tactile sensation signal according to an embodiment.

An embodiment will now be described in detail, referring to the drawings as necessary. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

First, a multi-touch operation will be described. A multi-touch operation refers to a plurality of touches being simultaneously in contact with the panel. In other words, a multi-touch operation refers to a plurality of touches in contact with the panel at a certain point in time. That is, a multi-touch operation refers to a plurality of touches at a plurality of positions on the panel that overlap with one another in time. Therefore, a multi-touch operation includes not only a plurality of touches that are started simultaneously, but also a plurality of touches that are detected simultaneously at a certain point in time. Specifically, if after a first touch is started, a second touch is started while the first touch is still ongoing, the first touch and the second touch constitute a multi-touch operation at the start of the second touch.

A multi-touch panel can be operated simultaneously by a plurality of users. On a multi-touch panel, a user can intuitively enlarge or rotate an object through an operation using a plurality of fingers. For a tactile sensation feedback in response to a multi-touch operation on such a multi-touch panel, it is preferred that a distinct tactile sensation is presented for each of the touches.

Where one attempts to simultaneously present tactile sensations at two or more touch positions using only one vibrator, the same type of a tactile sensation is presented at the same time at the touch positions. It is difficult, by using only one vibrator, to present a tactile sensation at an intended one of two or more touch positions that is different from the tactile sensation at the other touch positions.

Patent Document No. 1 (Japanese National Phase PCT Laid-Open Publication No. 2011-527791) discloses a technique in which a plurality of vibrators are used, whose vibration waveforms are ingeniously determined, so that the flexural amplitude is maximized at one touch position while the flexural amplitude is reduced or minimized at another touch position.

In a two-point multi-touch operation, the transfer function is varied between vibrations from two vibration sources to two touch positions so as to generate a difference in vibration amplitude between the two touch positions, and it is therefore a requirement that the transfer function be varied between vibrations from the vibration sources to the touch positions.

Typically, when a vibration is transmitted through a uniform substance, the vibration attenuates and/or delays depending on the distance. Therefore, two points at an equal distance from the vibration source have the same transfer function. Patent Document No. 1 (Japanese National Phase PCT Laid-Open Publication No. 2011-527791) discloses a configuration where vibration sources are arranged in an asymmetric manner with respect to the central axis of the touch panel. Even with this configuration, however, since there are many pairs of points having the same distance from the vibration source, there are many combinations of points having the same transfer function. Between such a pair of points, since the transfer function is the same, the vibration amplitude cannot be made different from each other, thereby failing to present different tactile sensations.

According to one embodiment of the present disclosure, the transfer function can be varied even between two points having the same distance from the vibration source, and the vibration amplitude can be varied between any points. In one embodiment of the present disclosure, at least one of the shape of the panel, the material of the panel, and the securing method of the panel, for example, is made asymmetric.

Embodiment 1

An electronic device according to Embodiment 1 will now be described with reference to FIG. 1 to FIG. 11.

<Device Configuration>

FIG. 1 is a diagram showing an electronic device 100 according to Embodiment 1. FIG. 1(a) is a top view showing the electronic device 100, and FIG. 1(b) is a cross-sectional view showing the electronic device 100 taken along an vibrator 102. FIG. 2 is a diagram showing a functional configuration of the electronic device 100. The electronic device 100 presents a tactile sensation to a user by vibrating a panel 101.

The electronic device 100 includes the panel 101, a plurality of vibrators 102, a touch information obtaining section 103, a tactile sensation presentation determining section 104, a transfer characteristic storing section 105, a transfer characteristic obtaining section 106, a filter calculation section 107, a tactile sensation signal storage section

108, and a filtering section 109. Each element of the electronic device 100 will be described below.

<Panel 101>

The panel 101 is a member for transmitting a vibration for presenting a tactile sensation. Specifically, the panel 101 is a light-transmitting plate-shaped member made of a glass or an acrylic material. In the illustrated example, the x direction is the longitudinal direction of the panel 101.

Note that there is no particular limitation on the shape, size, thickness, hardness, securing method, etc., of the panel 101. The transfer characteristic of vibration from an vibrator 102 to each position (hereinafter referred to also as "point") on the panel 101 varies depending on the shape, size, thickness, hardness, securing method, etc., of the panel 101.

<Vibrator 102>

The vibrators 102 are disposed at different positions of the panel 101. As shown in FIG. 1, for example, the vibrators 102 are each attached to an end portion of the panel 101. That is, the vibrators 102 are disposed outside an image display area 111 of the panel 101.

Each vibrator 102 drives the panel 101 in accordance with a drive signal. Thus, the vibration each vibrator 102 gives on the panel 101 propagates to the touch position of a user on the panel 101, thereby presenting a tactile sensation to the user.

In the present embodiment, the number of the vibrators 102 is greater than or equal to the number of touches that can be simultaneously detected by the touch information obtaining section 103. Thus, the electronic device 100 can present different tactile sensations to a plurality of touches that can be detected. Note the number of the vibrators 102 does not always need to be greater than or equal to the number of touches that can be detected. The number of the vibrators 102 may be less than the number of touches that can be simultaneously detected. In such a case, the electronic device 100 can control the tactile sensation at a number of touch positions, of all the touch positions, that is less than or equal to the number of the vibrators 102.

The vibrator 102 may be a piezoelectric element, for example. Alternatively, the vibrator 102 may be a voice coil. Moreover, the vibrator 102 may include an amplifier for amplifying the drive signal. There is no particular limitation on the type of the vibrator 102.

There is no particular limitation on the interval between vibrators 102. For example, the vibrators 102 may be arranged so as to make it possible to efficiently vibrate the panel 101.

<Touch Information Obtaining Section 103>

The touch information obtaining section 103 obtains a plurality of touch positions on the panel 101 by detecting a plurality of touches being simultaneously in contact with the panel 101. That is, the touch information obtaining section 103 obtains a plurality of touch positions on the panel 101 by detecting a user's multi-touch operation on the panel 101. For example, the touch information obtaining section 103 obtains touch information representing coordinates of a plurality of touch positions. For example, a multi-touch operation includes an operation where the user is simultaneously in contact with a plurality of positions on the panel.

The touch information obtaining section 103 may be, for example, a capacitive or pressure-sensitive multi-touch panel. For example, where the touch information obtaining section 103 is a capacitive multi-touch panel, the touch information obtaining section 103 obtains a plurality of touch positions based on changes in capacitance caused by multi-touch operations. For example, where the touch information obtaining section 103 is a pressure-sensitive multi-touch panel, the touch information obtaining section 103 obtains a plurality of touch positions based on changes in pressure caused by multi-touch operations.

Note that the multi-touch panel is not limited to a capacitive or pressure-sensitive multi-touch panel. That is, the multi-touch panel may be of any type as long as it is capable of detecting a multi-touch operation.

Note that the touch information obtaining section 103 may obtain, as touch information, information representing the contact area, load, pressure, etc., at each touch position, in addition to a plurality of touch positions. In such a case, the pressure can be easily obtained by using a pressure-sensitive multi-touch panel. The pressure may be obtained by using a weight sensor.

Note that where the touch information obtaining section 103 is a multi-touch panel, the panel 101 may be formed as an integral unit with the multi-touch panel of the touch information obtaining section 103. For example, the touch information obtaining section 103 and the panel 101 may be formed as a single member by attaching a capacitive multi-touch panel on the panel 101.

As shown in FIG. 1, a display device 110 such as a liquid crystal display or an organic EL display may be disposed under the panel 101 or the touch information obtaining section 103. Then, the electronic device 100 can function as a touch display. Note that the display device 110 does not always need to be provided, and the display device 110 may be absent.

Note that a plurality of touch positions on the panel 101 includes positions at which the user is in direct contact with the panel 101 or positions at which a pen, or the like, operated by the user is in contact with the panel 101.

<Tactile Sensation Presentation Determining Section 104>

The tactile sensation presentation determining section 104 determines a first touch position at which a tactile sensation is presented (hereinafter referred to also as a "presenting position"). For example, from among a plurality of touch positions, the tactile sensation presentation determining section 104 determines a first touch position at which a tactile sensation is presented by means of a vibration represented by a tactile sensation signal, and at least one second touch position at which a tactile sensation is not presented (hereinafter referred to also as a "non-presenting position").

Specifically, the tactile sensation presentation determining section 104 determines one presenting position, from among a plurality of touch positions, based on, for example, the position at which the GUI object is displayed, the load at the touch position, or the temporal or spatial relationship between the plurality of touch positions. The tactile sensation presentation determining section 104 determines, as non-presenting positions, those of the plurality of touch positions excluding the presenting position. Note that there is no particular limitation on the method for determining the presenting position.

<Transfer Characteristic Storing Section 105>

The transfer characteristic storing section 105 is a hard disk or a semiconductor memory, for example. For each point on the panel 101, the transfer characteristic storing section 105 stores transfer characteristics from the vibrators 102 to that point. That is, for a plurality of positions on the panel 101 and a plurality of vibrators 102, the transfer characteristic storing section 105 stores transfer characteristics each associated with a combination between a position and an vibrator 102.

The transfer characteristic storing section 105 stores the transfer characteristics for all of the combinations between M vibrators 102 (A1, A2, ..., AM) and N positions (P1(x1,y1), P2(x2,y2), ..., PN(xN,yN)). That is, M×N transfer characteristics are stored in the transfer characteristic storing section 105.

A transfer characteristic represents the relationship between an input and an output in a system. Herein, an input is drive signal of the vibrator, and an output is a vibration at one point on the panel. Typically, a transfer characteristic $G(\omega)$ is represented by a ratio of the output $Y(\omega)$ from the system with respect to the input $X(\omega)$ to the system ($G(\omega) = Y(\omega)/X(\omega)$). For example, where the input $X(\omega)$ is an impulse ($X(\omega)=1$), the transfer characteristic $G(\omega)$ coincides with the output $Y(\omega)$ (impulse response).

For each point on the panel 101, the transfer characteristic storing section 105 stores, as a transfer characteristic, the impulse response from each vibrator 102 to that point. Note that the impulse response may be represented in time domain or in frequency domain. That is, the transfer characteristic storing section 105 may store the time waveform of the impulse response or the spectrum of the impulse response.

Now, each point on the panel 101 may be a representative point (e.g., the center, the center of gravity, etc.) of a split area on the panel 101. The split areas are obtained by dividing the area on the panel 101 in a lattice pattern, each piece having a size of 10 mm. Note that the shape of a split area does not always need to be rectangular, but may be any other shape. The size of a split area does not need to be the same for all split areas. For example, the size of the split area may vary depending on the position on the panel 101.

Now, as each split area is smaller (i.e., as the number of split areas is larger), the resolution of tactile sensation presentation can be more improved, but this will increase the storage capacity required for storing transfer characteristics. That is, the resolution and the storage capacity are in a trade-off relationship, and the size of each split area can be determined based on the required resolution, the acceptable storage capacity, or the like.

<Transfer Characteristic Obtaining Section 106>

Of the plurality of transfer characteristics stored in the transfer characteristic storing section 105, the transfer characteristic obtaining section 106 obtains those associated with the touch positions obtained by the touch information obtaining section 103. That is, the transfer characteristic obtaining section 106 reads out, from the transfer characteristic storing section 105, transfer characteristics from the vibrators 102 to the touch positions.

<Filter Calculation Section 107>

The filter calculation section 107 is an example of a filter obtaining section. The filter calculation section 107 obtains a filter used for generating a desired drive signal by filtering an intended tactile sensation signal. Now, the desired drive signal is a signal for driving the vibrators 102 so that the panel 101 vibrates in accordance with an intended tactile sensation signal at a presenting position while the panel 101 vibrates in accordance with a signal having a lower vibration intensity than an intended tactile sensation signal at a non-presenting position. A signal having a lower vibration intensity than the intended tactile sensation signal is, for example, a signal having an amplitude that is 1/10 or less of the amplitude of the intended tactile sensation signal.

For example, a signal having a lower vibration intensity than an intended tactile sensation signal is a signal representing a vibration that cannot be sensed by a user. For example, the signal having a lower vibration intensity than the intended tactile sensation signal is a signal having an amplitude "0". In such a case, the filter calculation section 107 uses the transfer characteristics obtained by the transfer characteristic obtaining section 106 to calculate a filter such that a tactile sensation is presented only at a presenting position from among the plurality of touch positions obtained by the touch information obtaining section 103 while no tactile sensation is presented at the other touch positions (non-presenting positions). A specific filter calculation method for this will be described later.

<Tactile Sensation Signal Storage Section 108>

The tactile sensation signal storage section 108 is a hard disk or a semiconductor memory, for example. The tactile sensation signal storage section 108 stores tactile sensation signals. A tactile sensation signal represents a tactile sensation to be presented to a user. That is, a tactile sensation signal represents a vibration of the panel 101 at the presenting position.

Figure 3B:
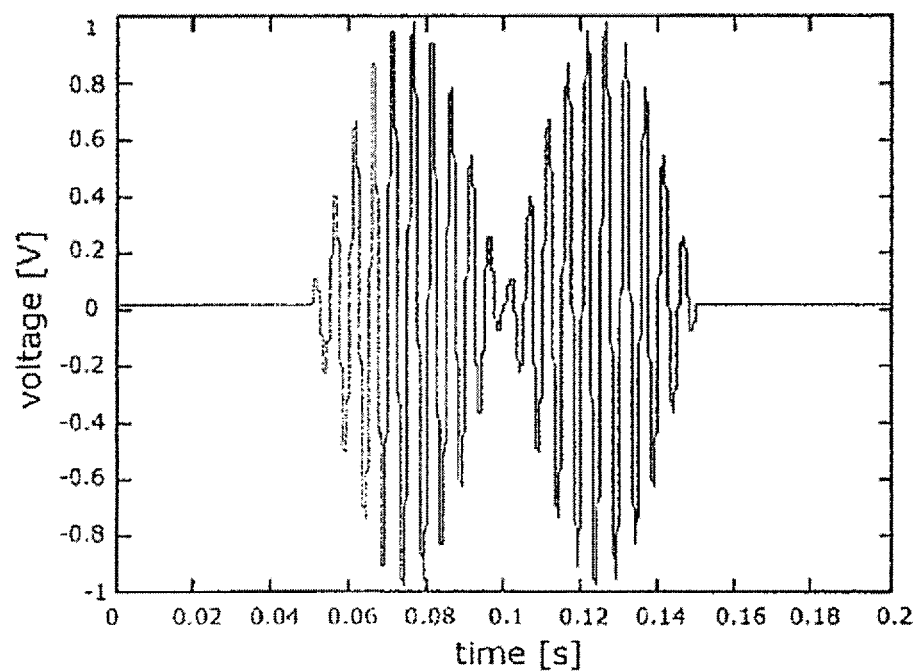

FIG. 3A and FIG. 3B each show an example of a tactile sensation signal. The tactile sensation signal storage section 108 stores tactile sensation signals as shown in FIG. 3A and FIG. 3B, for example.

While a tactile sensation signal may be any signal as long as a tactile sensation can be presented to a user, it may be determined based on a vibration characteristic of the panel 101, for example. Specifically, a tactile sensation signal may be a signal representing the resonance frequency of the panel 101 or a frequency in the vicinity thereof. Then, it is possible to improve the energy efficiency.

Now, an example of a method for generating a tactile sensation signal will be described. Where a tactile sensation signal is generated based on a signal of r cycles of a sine wave having a frequency fc, the sine wave is modulated by using a modulation frequency fm for which r cycles is exactly the half cycle, as shown in Expression 1, thereby generating a tactile sensation signal s(n) as shown in FIG. 3A.

[Exp. 1]

$$s(n) = \sin(2\pi f_m n T_s)\sin(2\pi f_c n T_s) \qquad (1)$$
$$f_m = \frac{f_c}{2r}$$

Here, Ts represents the sampling period, and n represents the discretized frequency unit. In the example of FIG. 3A, since fc=200 Hz and r=10, the modulation frequency fm is 10 Hz. The tactile sensation signal thus generated can be used as a signal for presenting a tactile sensation when a button, a GUI object, is clicked, for example.

Note that the tactile sensation signal does not always need to be a signal generated as described above. For example, such a modulation as shown in Expression 1 does not need to be done. A sine wave may be used as the tactile sensation signal.

Note that the frequency fc may be any frequency as long as it can be sensed by a human as a tactile sensation. For example, the frequency fc may be determined based on the vibration characteristic of the panel 101.

For example, the frequency fc may be determined so as to coincide with the resonance frequency of the panel 101. If the frequency fc is determined in such a manner, it is possible to reduce the attenuation of the vibration given to the panel 101 by the vibrator 102, and to efficiently present a tactile sensation.

Note that although the tactile sensation signal is generated off-line in advance and stored in the tactile sensation signal storage section 108 in the present embodiment, it may be generated on-line after a multi-touch operation is detected. Then, it is possible to save the storage area for tactile sensation signals.

<Filtering Section 109>

The filtering section 109 is an example of a drive signal obtaining section. The filtering section 109 generates a drive signal for driving each vibrator 102 by filtering the tactile sensation signal stored in the tactile sensation signal storage section 108 by using a filter for the vibrator 102 calculated by the filter calculation section 107. The filtering section 109 functions as a vibration controller for controlling the vibration of the vibrator 102. Note that elements 104 to 109 may be referred to as a vibration controller.

Each vibrator 102 vibrates the panel 101 in accordance with the drive signal thus generated by the filtering section 109. As a result, there is generated a vibration based on the tactile sensation signal only at a presenting position, from among the plurality of touch positions, while the vibration is suppressed at a non-presenting position. Thus, the electronic device 100 is capable of presenting a tactile sensation to a user at a presenting position while not presenting a tactile sensation at a non-presenting position.

<Filter Calculation Section 107>

The operation of the filter calculation section 107 will now be described in greater detail. The filter calculation section 107 calculates a filter so that the sum-of-product in frequency domain between the filter and the transfer characteristic from each vibrator 102 to the presenting position represents the impulse, and the sum-of-product in frequency domain between the filter and the transfer characteristic from each vibrator 102 to the non-presenting position represents zero.

Specifically, the filter calculation section 107 calculates a filter in frequency domain as follows.

The response D expressed in frequency domain is expressed as shown in Expression 2 by using the transfer characteristic G and the filter H expressed in frequency domain.

[Exp. 2]

$$D = GH \qquad (2)$$

$$D = \begin{bmatrix} D_1(\omega) \\ D_2(\omega) \\ \vdots \\ D_N(\omega) \end{bmatrix}$$

$$G = \begin{bmatrix} G_{11}(\omega) & G_{12}(\omega) & \ldots & G_{1M}(\omega) \\ G_{21}(\omega) & G_{22}(\omega) & \ldots & G_{2M}(\omega) \\ \vdots & \vdots & \ddots & \vdots \\ G_{N1}(\omega) & G_{N2}(\omega) & \ldots & G_{NM}(\omega) \end{bmatrix}$$

$$H = \begin{bmatrix} H_1(\omega) \\ H_2(\omega) \\ \vdots \\ H_M(\omega) \end{bmatrix}$$

In Expression 2, the transfer characteristic $G_{ij}(\omega)$ is a transfer characteristic from an vibrator $A_j$ to a touch position $P_i$, and is expressed in frequency domain. The filter $H_j(\omega)$ is a filter for generating a drive signal of the vibrator $A_j$, and is expressed in frequency domain. The response $D_i(\omega)$ is a response at the touch position $P_i$, and is expressed in frequency domain.

Now, for the frequency band to be the subject of control, a desired filter can be obtained if one can calculate the filter H such that only the response $d_k$ for a touch position $P_k(0<k\leq N)$, from among a plurality of touch positions $P_1$ to $P_N$, is the impulse ($D_k(\omega)=1$), while the response for any other touch position $P_l$ ($0<l\leq N$, $l\neq k$) is zero ($D_l(\omega)=0$).

Note that the frequency band to be the subject of control may be determined based on a frequency band that can be sensed by a human as a tactile sensation, for example. Since the tactile sensation of a human is typically sensitive over a range from some Hz to 500 Hz, the frequency band to be the subject of control may be determined to be 10 Hz to 500 Hz, for example.

While there is no particular limitation on the method for calculating a filter as described above, it is possible to calculate a filter as shown in Expression 3 by calculating the generalized inverse matrix G* of G. That is, H representing a desired filter can be calculated from the generalized inverse matrix G* of G and D representing the impulse.

[Exp. 3]

$$H = G^*D \qquad (3)$$

Thus, the filter calculation section 107 can easily calculate a filter by calculating the generalized inverse matrix G* shown in Expression 3. In this example, G expressed in frequency domain is a matrix of N rows and M columns, as shown in Expression 2.

That is, with the electronic device 100 of the present embodiment, it is possible to easily calculate the inverse matrix of a matrix representing a transfer characteristic by calculating a filter in frequency domain, thereby making it possible to reduce the process load. Thus, even with devices having low processing capacities such as smartphones and tablet computers, it is possible to appropriately present a tactile sensation in response to a multi-touch operation. Moreover, since it is possible to reduce the process load for tactile sensation presentation, it is possible to perform processes for tactile sensation presentation in parallel to other processes.

Figure 4:
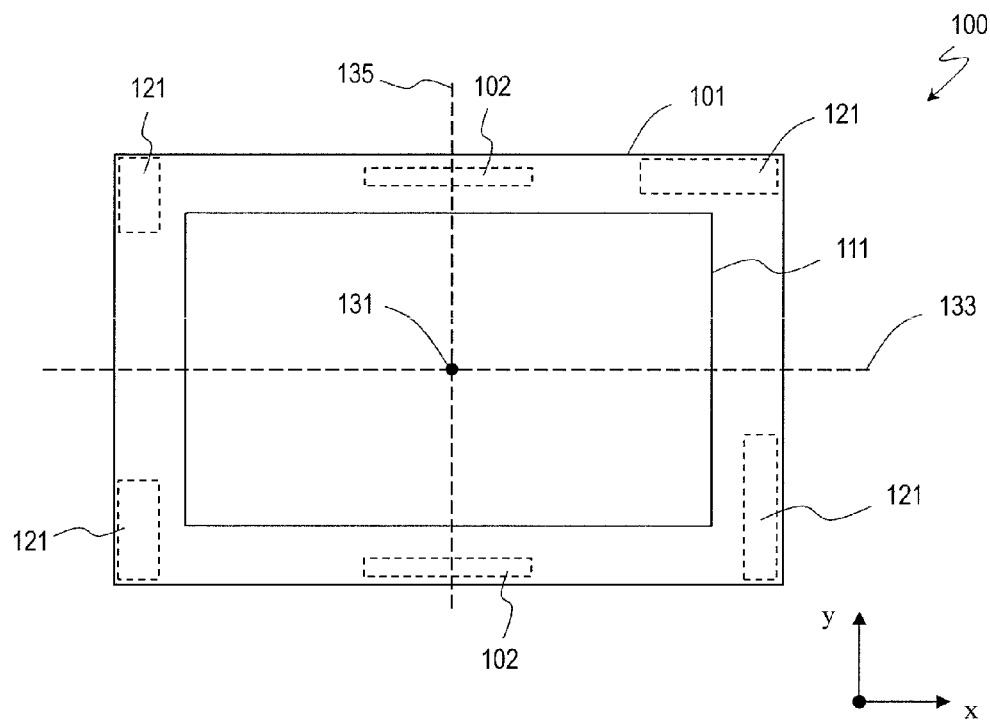
FIG. 4 is a diagram showing an electronic device according to an embodiment.

Next, referring to FIG. 1 and FIG. 4, the manner of securing the panel 101 will be described. FIG. 4 is a plan view showing the electronic device 100.

The peripheral portion of the panel 101 is supported on a casing 115 with a securing member (spacer) 121 interposed therebetween. The panel 101 is arranged so as to cover the image display area 111 of the display device 110. While the panel 101 is configured to cover the entire surface of the image display area 111 of the display device 110 in this example, the present disclosure is not limited thereto as long as it is configured so as to cover at least a portion of the image display area 111.

The securing member 121 is a connecting member for connecting the panel 101 to the casing 115. The securing member 121 is a cushioning member such as silicon rubber or urethane rubber, for example. By using a cushioning member as the securing member 121, the vibration of the panel 101 is less transmitted to the casing 115.

While the peripheral portion of the panel 101 is typically secured to the casing 115 in a symmetric manner with respect to a center 131 of the panel 101, the peripheral portion of the panel 101 is secured to the casing 115 in an asymmetric manner with respect to the center 131 in the present embodiment. Note that the center 131 may be the center of the image display area 111. For example, as the shape of the securing member 121 in a part of the peripheral portion of the panel 101 is different from the shape of the securing member 121 in other parts of the peripheral portion, the panel 101 is secured in an asymmetric manner. In the example shown in FIG. 4, the shape of the securing member 121 connected to the peripheral portion of the panel 101 is varied between four corners.

For example, as the securing strength in a part of the peripheral portion of the panel 101 is different from the securing strength in other parts of the peripheral portion, the panel 101 can be secured in an asymmetric manner. For example, the panel 101 can be secured in an asymmetric manner by firmly securing one of the four corners of the panel 101 while less firmly securing the other parts.

With such a manner of securing, for example, the panel 101 is secured to the casing 115 in an asymmetric manner with respect to an axis that passes through the center 131 of the panel 101 and that is parallel to the planar direction of the panel 101 (the xy direction). For example, the panel 101 is secured in an asymmetric manner with respect to an axis of symmetry 133 that passes through the center 131 and that extends in the x direction. For example, the panel 101 is secured in an asymmetric manner with respect to an axis of symmetry 135 that passes through the center 131 and that extends in the y direction. The panel 101 may be secured in an asymmetric manner with respect to both the axes of symmetry 133 and 135. Note that while the axis of symmetry 133 and the axis of symmetry 135 cross each other perpendicularly in this example, they may cross each other at an angle other than perpendicular.

For example, the shape of the securing member 121 may be asymmetric with respect to the center 131 of the panel 101. For example, the shape of the securing member 121 may be asymmetric with respect to an axis that passes through the center 131 of the panel 101 and that is parallel to the planar direction of the panel 101 (the xy direction). For example, the shape of the securing member 121 may be asymmetric with respect to at least one of the axes of symmetry 133 and 135.

For example, the hardness of the securing member 121 may vary in an asymmetric manner with respect to the center 131 of the panel 101. For example, the hardness of the securing member 121 may vary in an asymmetric manner with respect to an axis that passes through the center 131 of the panel 101 and that is parallel to the planar direction of the panel 101 (the xy direction). For example, the hardness of the securing member 121 may vary in an asymmetric manner with respect to at least one of the axes of symmetry 133 and 135.

Two vibrators 102 are arranged in a symmetric manner with respect to the center 131 of the panel 101. For example, as shown in FIG. 4, the two vibrators 102 are arranged in a symmetric manner with respect to the axis of symmetry 133. The two vibrators 102 may be arranged in a symmetric manner with respect to the axis of symmetry 135.

The center 131 may be, for example, the center of gravity of the member to be vibrated as viewed from the control surface side. The center 131 may be, for example, a point at which the diagonal lines of the member to be vibrated cross each other. The member to be vibrated is, for example, the panel 101. The member to be vibrated may be, for example, the panel 101 and the display device 110, or may be the product as a whole.

<Operation>

Figure 5:
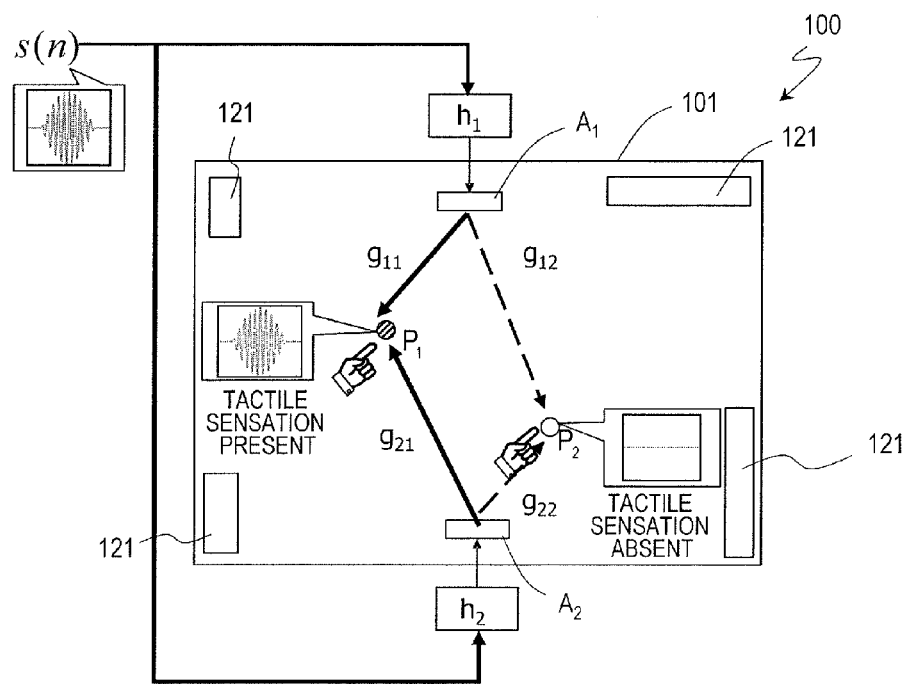
FIG. 5 is a diagram showing an electronic device according to an embodiment.
Figure 6:
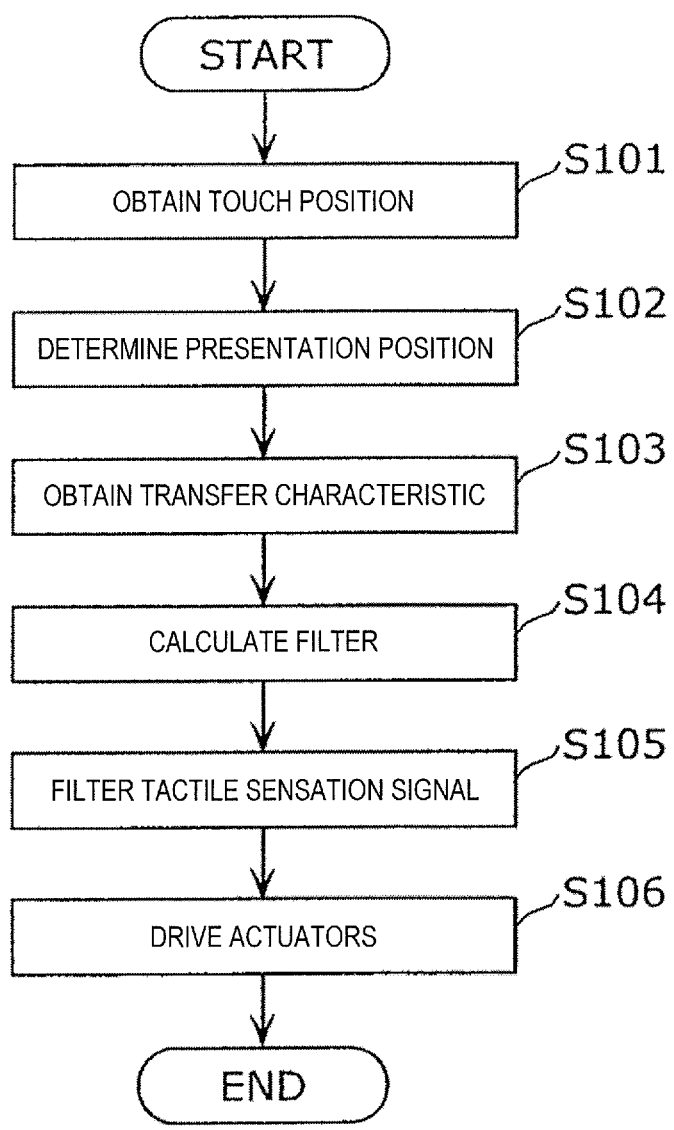
FIG. 6 is a flow chart showing an operation of an electronic device according to an embodiment.

Next, the operation of each element of the electronic device 100 will be described in greater detail. FIG. 5 is a diagram showing a process operation of the electronic device 100. FIG. 6 is a flow chart showing a process operation of the electronic device 100. Note that a case where a tactile sensation is presented only at a presenting position, from among a plurality of touch positions, will be described below as an example.

<Step S101>

First, the touch information obtaining section 103 obtains a plurality of touch positions on the panel 101 by detecting a multi-touch operation (S101). For example, the touch information obtaining section 103 obtains two touch positions $P_1$ and $P_2$ shown in FIG. 5.

Specifically, the touch information obtaining section 103 obtains, as a touch position, the center position of a finger of a user on the panel 101 at predetermined time intervals, for example. Note that the touch information obtaining section 103 does not always need to obtain, as a touch position, the center position of a finger. For example, the touch information obtaining section 103 may obtain, as a touch position, the center of gravity of the load applied by the finger.

<Step S102>

Next, the tactile sensation presentation determining section 104 determines, from among the plurality of touch positions obtained, a first touch position (the presenting position) at which a tactile sensation is presented, and a second touch position (the non-presenting position) at which a tactile sensation is not presented (S102). For example, the tactile sensation presentation determining section 104 determines, between the two touch positions $P_1$ and $P_2$, the touch position $P_1$ as the presenting position and the touch position $P_2$ as the non-presenting position.

Specifically, the tactile sensation presentation determining section 104 determines the presenting position based on the displayed information, for example. More specifically, the tactile sensation presentation determining section 104 determines, as the presenting position, a touch position at which a GUI object (e.g., a button or a slider, etc.) is displayed, for example. For example, the tactile sensation presentation determining section 104 may determine, as the presenting position, a touch position on a web browser at which link information is displayed.

Note that the tactile sensation presentation determining section 104 does not always need to determine the presenting position based on the displayed information. For example, the tactile sensation presentation determining section 104 may determine the presenting position based on the magnitude of the load, the duration of the touch, or the positional relationship between a plurality of touch positions.

The tactile sensation presentation determining section 104 does not always need to determine a presenting position when a plurality of touch positions are obtained by the touch information obtaining section 103. For example, if there is no touch position, from among a plurality of touch positions, that satisfies a predetermined condition, the tactile sensation presentation determining section 104 may determine all the touch positions to be non-presenting positions without determining any position as the presenting position. For example, if touch positions change substantially over time, the touch positions may all be determined as non-presenting positions. In such a case, there is no need to present a tactile sensation, and control returns to the process of step S101.

<Step S103>

Next, the transfer characteristic obtaining section 106 obtains, from the transfer characteristic storing section 105, a transfer characteristic associated with a plurality of touch positions obtained by the touch information obtaining section 103 (S103). For example, the transfer characteristic obtaining section 106 reads out, from the transfer characteristic storing section 105, the transfer characteristics $g_{11}$ and $g_{21}$ from each of the vibrators $A_1$ and $A_2$ (corresponding to the vibrators 102) to the touch position $P_1$, and the transfer characteristics $g_{12}$ and $g_{22}$ from each of the vibrators $A_1$ and $A_2$ to the touch position $P_2$.

<Step S104>

Then, the filter calculation section 107 calculates a filter such that a tactile sensation is presented at a presenting position and a tactile sensation is not presented at a non-presenting position (S104). Specifically, the filter calculation section 107 calculates the filter using the transfer characteristic from each vibrator 102 to the presenting position and the transfer characteristic from each vibrator 102 to the non-presenting position. For example, the filter calculation section 107 calculates, by using transfer characteristics $g_{11}$, $g_{12}$, $g_{21}$ and $g_{22}$, a filter such that a tactile sensation is presented at the touch position $P_1$ and a tactile sensation is not presented at the touch position $P_2$.

<Step S105>

Next, the filtering section 109 generates a drive signal for driving each vibrator 102 by filtering the tactile sensation signal s(n) stored in the tactile sensation signal storage section 108 by using filters $h_1$ and $h_2$ calculated in step S104.

Note that if a plurality of tactile sensation signals are stored in the tactile sensation signal storage section 108, the filtering section 109 selects one tactile sensation signal from among a plurality of tactile sensation signals, and filters the selected tactile sensation signal. For example, the filtering section 109 selects the tactile sensation signal shown in FIG. 3A from among the tactile sensation signals shown in FIG. 3A and FIG. 3B. Note that there is no particular limitation on the method for selecting the tactile sensation signal.

<Step S106>

Next, the vibrator $A_j$ is driven by using the drive signal $u_j(n)$ generated in step S105. That is, the vibrator $A_j$ vibrates the panel 101 in accordance with the drive signal $u_j(n)$.

Note that depending on the type of the vibrator, a high-voltage drive signal may be needed. In such a case, the vibrator 102 may include an amplifier for amplifying the drive signal.

Figure 7A:
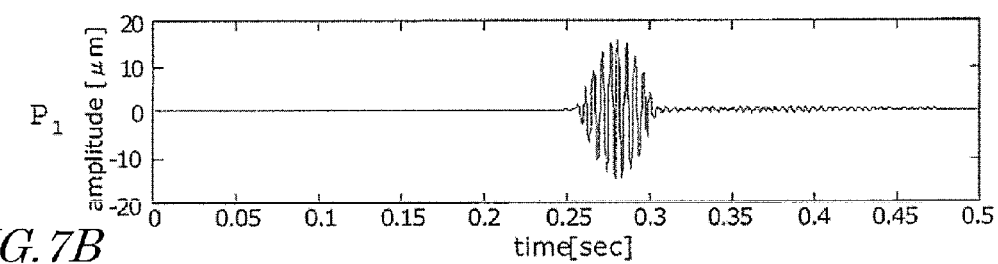
FIG. 7A and FIG. 7B are graphs each showing a vibration of the panel at a touch position according to an embodiment.
Figure 7B:
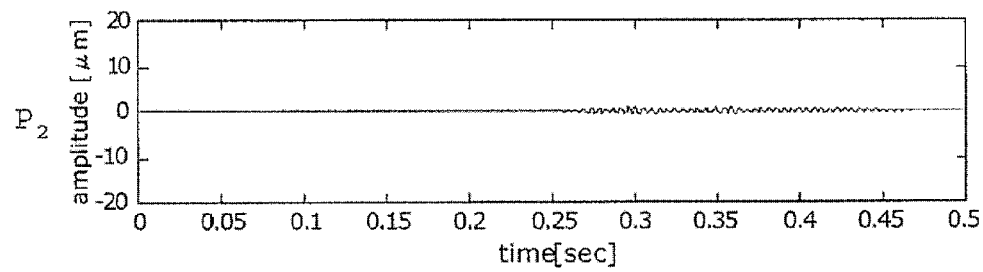

FIG. 7A and FIG. 7B show the results of an experiment of vibrating the panel 101 at the touch positions. Specifically, FIG. 7A and FIG. 7B show the vibration of the panel 101 at the touch positions $P_1$ and $P_2$ when the vibrator 102 is driven by using the drive signal described above.

As shown in FIG. 7A, at the touch position $P_1$, the peak-to-peak difference of vibration (hereinafter referred to as the "amplitude level") is about 30 µm, indicating a strong vibration. On the other hand, as shown in FIG. 7B, at the touch position $P_2$, the amplitude level is about 1 µm, indicating that the vibration is at such a level that it cannot be sensed by a human.

Note that while FIG. 7A and FIG. 7B show vibration characteristics at the touch positions $P_1$ and $P_2$, a vibration occurs at positions other than the touch positions $P_1$ and $P_2$. However, since positions other than the touch positions $P_1$ and $P_2$ are those that are not touched by the user, no tactile sensation will be presented to the user irrespective of the vibration occurring at such positions.

Now, the relationship between the touch position and the transfer function will be described. When presenting a tactile sensation for a two-point multi-touch operation, a difference is created between the vibration amplitudes of two touch positions by varying the transfer function between the vibrations from two vibrators to two touch positions, and it is therefore a requirement that the transfer function be varied between variations from the vibration sources to the touch positions.

Figure 8:
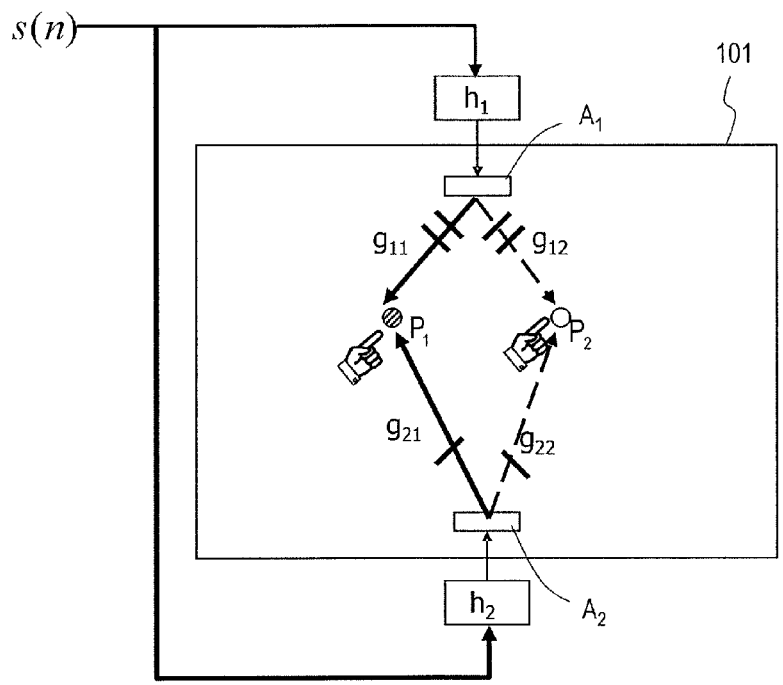
FIG. 8 is a diagram showing a relationship between the touch position and the transfer function.

Typically, when a vibration is transmitted through a uniform substance, the vibration attenuates and/or delays depending on the distance. Therefore, two points at an equal distance from an vibrator have the same transfer function. For example, there are cases where the distance between the touch position $P_1$ and the vibrator $A_1$ is equal to the distance between the touch position $P_2$ and the vibrator $A_1$, and the distance between the touch position $P_1$ and the vibrator $A_2$ is equal to the distance between the touch position $P_2$ and the vibrator $A_2$, as shown in FIG. 8. Then, the transfer characteristics $g_{11}$ and $g_{12}$ from the vibrator $A_1$ to the touch positions $P_1$ and $P_2$ are equal to each other, and the transfer characteristics $g_{21}$ and $g_{22}$ from the vibrator $A_2$ to the touch positions $P_1$ and $P_2$ are equal to each other. Where $g_{11}=g_{12}$ and $g_{21}=g_{22}$ as described above, it is no longer possible to calculate the inverse matrix (there is no difference between transfer functions), and the vibration amplitudes cannot be made different from each other, thereby failing to present different tactile sensations.

Figure 9:
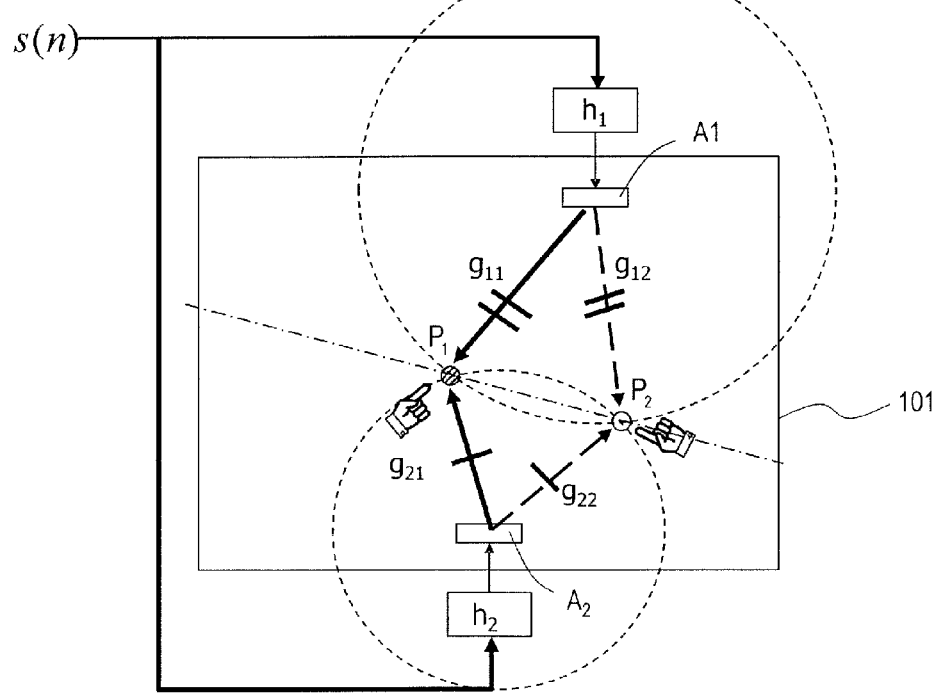
FIG. 9 is a diagram showing a relationship between the touch position and the transfer function.

This problem occurs even with a configuration where the vibrators $A_1$ and $A_2$ are arranged in an asymmetric manner with respect to the center 131 of the panel (FIG. 4), as shown in FIG. 9. Even with a configuration shown in FIG. 9, there are many pairs of points having the same distance from the vibrator, and since the transfer function is the same between such a pair of points, the vibration amplitude cannot be made different from each other, thereby failing to present different tactile sensations.

Figure 10:
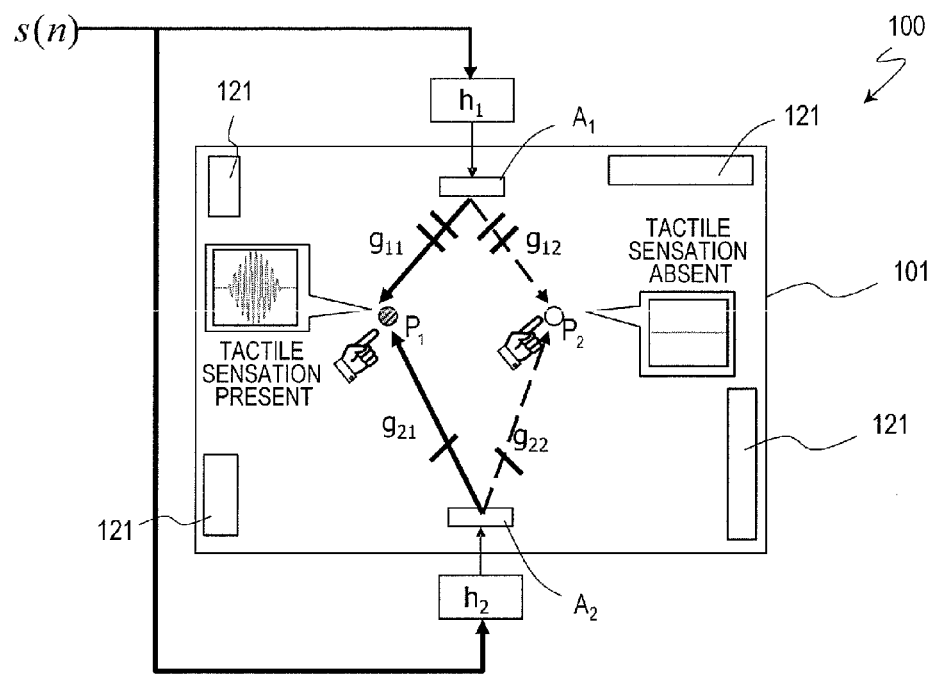
FIG. 10 is a diagram showing an electronic device according to an embodiment.

On the other hand, with the electronic device 100 of the present embodiment, the peripheral portion of the panel 101 is secured to the center 131 of the panel (FIG. 4) in an asymmetric manner with respect to the casing 115, as described above, and the transfer characteristics of the vibration of the panel 101 are uneven. Therefore, as shown in FIG. 10, even if the distance between the touch position $P_1$ and the vibrator $A_1$ is equal to the distance between the touch position $P_2$ and the vibrator $A_1$, the transfer characteristic of vibration of the panel 101 between the touch position $P_1$ and the vibrator $A_1$ will be different from the transfer characteristic of vibration of the panel 101 between the touch position $P_2$ and the vibrator $A_1$. That is, the vibration transfer characteristic of the panel 101 for the vibration transmitted from the vibrator $A_1$ to the touch position $P_1$ will be different from the vibration transfer characteristic of the panel 101 for the vibration transmitted from the vibrator $A_1$ to the touch position $P_2$. Therefore, even if the distance is the same, the transfer function will not be the same, and it is possible to present different tactile sensations. Similarly, even if the distance between the touch position $P_1$ and the vibrator $A_2$ is equal to the distance between the touch position $P_2$ and the vibrator $A_2$, the transfer characteristic of vibration of the panel 101 between the touch position $P_1$ and the vibrator $A_2$ will be different from the transfer characteristic of vibration of the panel 101 between the touch position $P_2$ and the vibrator $A_2$. That is, the vibration transfer characteristic of the panel 101 for the vibration transmitted from the vibrator $A_2$ to the touch position $P_1$ is different from the transfer characteristic of vibration of the panel 101 for the vibration transmitted from the vibrator $A_2$ to the touch position $P_2$. Therefore, even if the distance is the same, the transfer function will not be the same, and it is possible to present different tactile sensations.

There are cases where the distance between the touch position $P_1$ and the vibrator $A_1$ is equal to the distance between the touch position $P_1$ and the vibrator $A_2$, and the distance between the touch position $P_2$ and the vibrator $A_1$ is equal to the distance between the touch position $P_2$ and the vibrator $A_2$. Then, the transfer function is $g_{11}=g_{21}$ and $g_{12}=g_{22}$, and the touch positions $P_1$ and $P_2$ will both have the same transfer function from the vibrator. Also in such a case, it is no longer possible to calculate the inverse matrix (there is no difference between transfer functions), and the vibration amplitudes cannot be made different from each other, thereby failing to present different tactile sensations. On the other hand, even in such a case, with the electronic device 100 of the present embodiment, the transfer characteristic of vibration of the panel between the touch position $P_1$ and the vibrator $A_1$ is different from the transfer characteristic of vibration of the panel between the touch position $P_1$ and the vibrator $A_2$. That is, the vibration transfer characteristic of the panel 101 for the vibration transmitted from the vibrator $A_1$ to the touch position $P_1$ is different from the transfer characteristic of vibration of the panel 101 for the vibration transmitted from the vibrator $A_2$ to the touch position $P_1$. Therefore, even if the distance is the same, the transfer function will not be the same, and it is possible to present different tactile sensations. Similarly, the transfer characteristic of vibration of the panel between the touch position $P_2$ and the vibrator $A_1$ is different from the transfer characteristic of vibration of the panel between the touch position $P_2$ and the vibrator $A_2$. That is, the vibration transfer characteristic of the panel 101 for the vibration transmitted from the vibrator $A_1$ to the touch position $P_2$ is different from the vibration transfer characteristic of the panel 101 for the vibration transmitted from the vibrator $A_2$ to the touch position $P_2$. Therefore, even if the distance is the same, the transfer function will not be the same, and it is possible to present different tactile sensations.

Note that while the manner of securing the panel 101 is different for each of the four corners in the examples shown in FIG. 4, FIG. 5 and FIG. 10, at least the manner of securing at one of the four corners may be different from the other corners. The manner of securing the panel 101 may be asymmetric at portions other than the four corners. There is no limitation as long as the manner of securing the panel 101 is asymmetric so that any two points on the panel 101 will have different transfer functions.

Advantageous Effect

As described above, with the electronic device 100 of the present embodiment, it is possible to present a tactile sensation at a presenting position while presenting a weaker tactile sensation or no tactile sensation at a non-presenting position. Therefore, for a touch in a multi-touch operation for which a tactile sensation needs to be presented, it is possible to present a tactile sensation that is different from that for the other touches in the multi-touch operation, thus realizing an appropriate tactile feedback. That is, it is possible to reduce the possibility of confusion by unnecessarily presenting tactile sensations.

With the electronic device 100 of the present embodiment, the manner of supporting the panel 101 is asymmetric so that any two points on the panel 101 will have different transfer functions, and it is possible to make the vibration amplitude different between any combination of two points and to present different tactile sensations at the two points.

Variation of Embodiment 1

Figure 11:
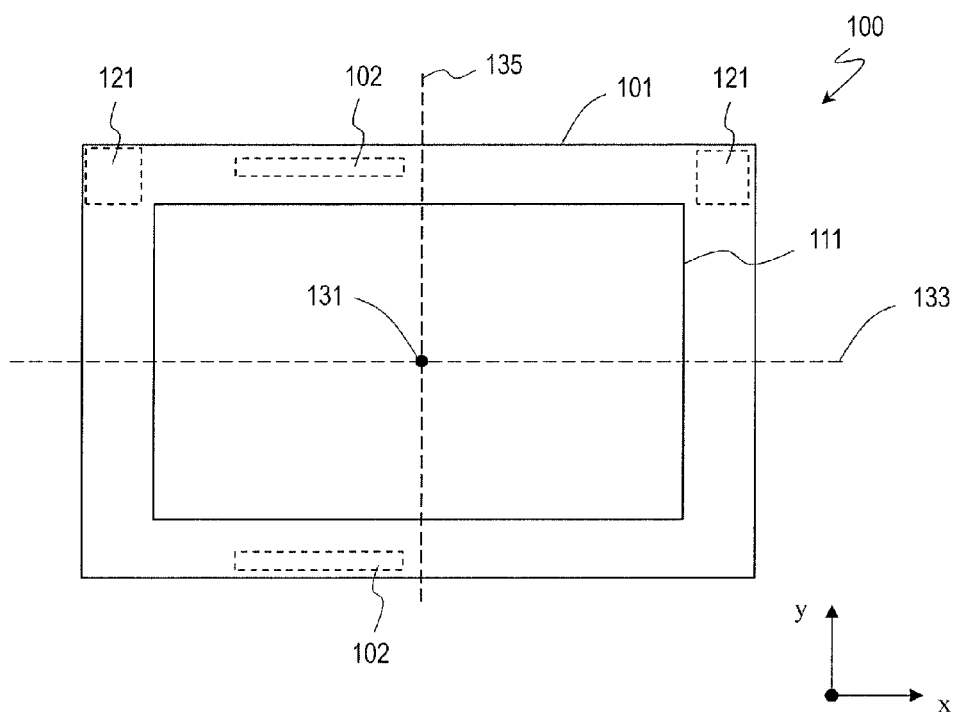
FIG. 11 is a diagram showing an electronic device according to an embodiment.

Next, a variation of the electronic device 100 according to Embodiment 1 will be described. FIG. 11 is a plan view showing the electronic device 100. In this example, the axis of symmetry for the arrangement of the vibrators 102 is different from the axis of symmetry for the manner of securing the panel. For example, as shown in FIG. 11, two vibrators 102 are arranged in a symmetric manner with respect to the axis of symmetry 133 that passes through the center 131 of the panel 101 and that extends in the x direction. The two vibrators 102 are also arranged in an asymmetric manner with respect to the axis of symmetry 135 that passes through the center 131 of the panel 101 and that extends in the y direction.

On the other hand, while the panel 101 is secured in a symmetric manner with respect to the axis of symmetry 135, the panel 101 is secured in an asymmetric manner with respect to the axis of symmetry 133. In the example shown in FIG. 11, the securing members 121 are arranged at the upper two corners of the four corners of the panel 101, but are absent at the lower two corners.

Thus, also when the axis of symmetry for the arrangement of the vibrators 102 is different from the axis of symmetry for the manner of securing the panel, any two points on the panel 101 will have different transfer functions, and it is possible to make the vibration amplitude different between any combination of two points and to present different tactile sensations at the two points.

Embodiment 2

Figure 12:
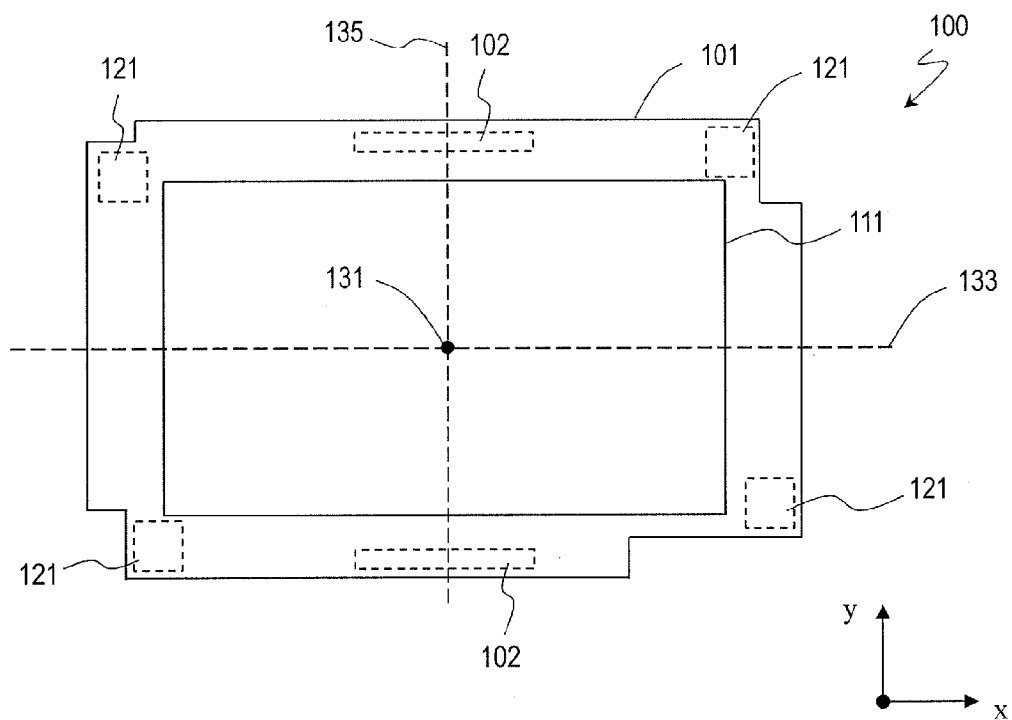
FIG. 12 is a diagram showing an electronic device according to an embodiment.

FIG. 12 is a diagram showing an electronic device 100 according to Embodiment 2. The electronic device 100 according to Embodiment 2 is different from the electronic device 100 of Embodiment 1 in that the shape of the panel 101 is asymmetric. The embodiment will now be described while focusing on what is different from the electronic device 100 of Embodiment 1.

In the present embodiment, the panel 101 has a planar shape that is asymmetric with respect to the center 131 of the panel 101. For example, the panel 101 has a planar shape that is asymmetric with respect to the axis of symmetry 133. For example, the panel 101 has a planar shape that is asymmetric with respect to the axis of symmetry 135. In the example shown in FIG. 12, the four corners of the panel 101 each have a different shape. Thus, as the panel 101 has an asymmetric planar shape, any two points on the panel 101 will have different transfer functions, and it is possible to make the vibration amplitude different between any combination of two points and to present different tactile sensations at the two points.

Note that in this example, two vibrators 102 are arranged in a symmetric manner with respect to the center 131 of the panel 101. For example, as shown in FIG. 12, the two vibrators 102 are arranged in a symmetric manner with respect to the axis of symmetry 133. The two vibrators 102 may be arranged in a symmetric manner with respect to the axis of symmetry 135. Thus, even if the vibrators 102 are arranged in a symmetric manner, the panel 101 has an asymmetric planar shape in the present embodiment so that any two points on the panel 101 will have different transfer functions, and it is possible to make the vibration amplitude different between any combination of two points and to present different tactile sensations at the two points.

The peripheral portion of the panel 101 may be supported on the casing 115 in a symmetric manner. Also in such a case, since the panel 101 has an asymmetric planar shape in the present embodiment, any two points on the panel 101 will have different transfer functions, and it is possible to make the vibration amplitude different between any combination of two points and to present different tactile sensations at the two points.

Note that while the four corners of the panel 101 each have a different shape in the example shown in FIG. 12, at least one of the four corners may have a different shape from that of the other corners. The shape of the panel 101 may be asymmetric in portions other than the four corners. There is no limitation as long as the shape of the panel is asymmetric so that any two points on the panel 101 will have different transfer functions.

Embodiment 3

Figure 13:
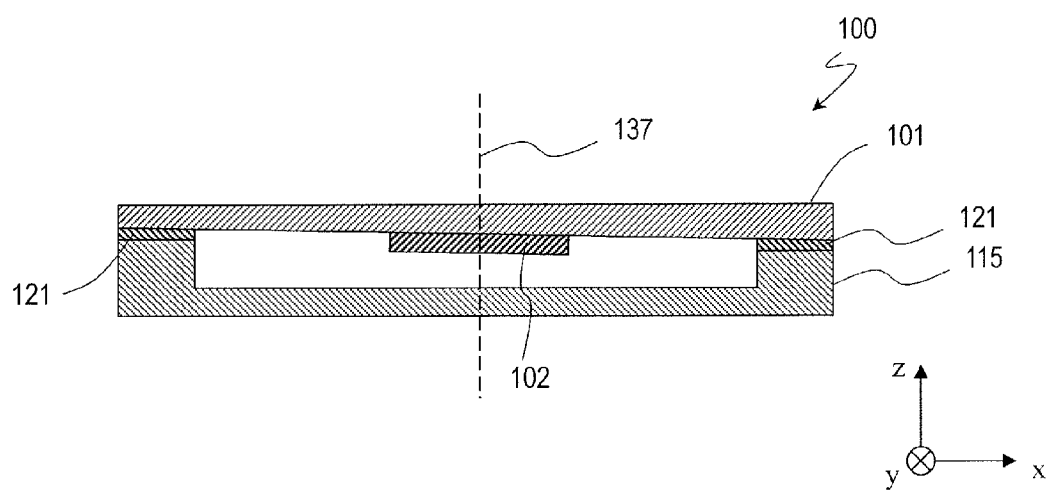
FIG. 13 is a diagram showing an electronic device according to an embodiment.

FIG. 13 is a diagram showing an electronic device 100 according to Embodiment 3. FIG. 13 shows a cross section along an vibrator 102 of the electronic device 100. The electronic device 100 according to Embodiment 3 is different from the electronic device 100 of Embodiment 1 in that the shape of the panel 101 in the thickness direction is asymmetric. The embodiment will now be described while focusing on what is different from the electronic device 100 of Embodiment 1.

In the present embodiment, the thickness of the panel 101 is asymmetric with respect to the center 131 of the panel 101 (FIG. 4). For example, the thickness of the panel 101 is asymmetric with respect to an axis 137 that passes through the center 131 of the panel 101 and that is perpendicular to the planar direction of the panel 101. In the example shown in FIG. 13, the panel 101 has a tapered shape of which the thickness gradually increases from one end to the other end in the x direction. Thus, as the panel 101 has an asymmetric cross-sectional shape, any two points on the panel 101 will have different transfer functions, and it is possible to make the vibration amplitude different between any combination of two points and to present different tactile sensations at the two points.

Note that in this example, the two vibrators 102 are arranged in a symmetric manner with respect to the center 131 of the panel 101. For example, the two vibrators 102 are arranged in a symmetric manner with respect to the axis of symmetry 133. Two vibrators 102 may be arranged in a symmetric manner with respect to the axis of symmetry 135. Thus, even if the vibrators 102 are arranged in a symmetric manner, the panel 101 has an asymmetric cross-sectional shape in the present embodiment so that any two points on the panel 101 will have different transfer functions, and it is possible to make the vibration amplitude different between any combination of two points and to present different tactile sensations at the two points.

The peripheral portion of the panel 101 may be supported on the casing 115 in a symmetric manner. Also in such a case, since the panel 101 has an asymmetric cross-sectional shape in the present embodiment, any two points on the panel 101 will have different transfer functions, and it is possible to make the vibration amplitude different between any combination of two points and to present different tactile sensations at the two points.

The panel 101 may have a symmetric planar shape. Also in such a case, since the panel 101 has an asymmetric cross-sectional shape in the present embodiment, any two points on the panel 101 will have different transfer functions, and it is possible to make the vibration amplitude different between any combination of two points and to present different tactile sensations at the two points.

Note that the cross-sectional shape of the panel 101 is not limited to a tapered shape as shown in FIG. 13, and the panel 101 may have any other shape such that the cross-sectional shape thereof is asymmetric. There is no limitation as long as the cross-sectional shape of the panel 101 is asymmetric so that any two points on the panel 101 will have different transfer functions.

The panel 101 may have an asymmetric combination of materials. Also in such a case, there is no limitation as long as the materials of the panel 101 are asymmetric so that any two points on the panel 101 will have different transfer functions.

Figure 14:
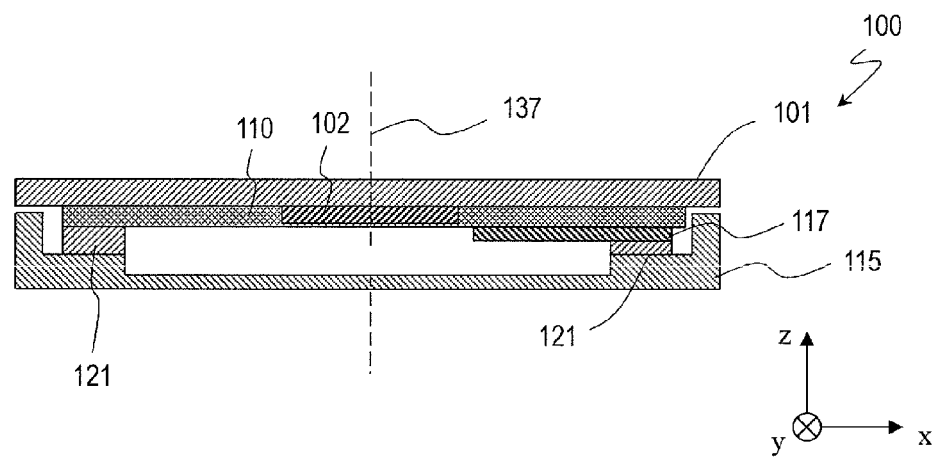
FIG. 14 is a diagram showing an electronic device according to an embodiment.

As shown in FIG. 14, a certain circuit 117, or the like, may be bonded on the panel 101 while being lopsided with respect to the center of panel 101, thereby making uneven the transfer characteristic of vibration of the panel. The transfer functions at any two points on the panel 101 may be made different from each other by making uneven the transfer characteristic of vibration of the panel as described above.

Note that while the securing member 121 secures the circuit 117 and the casing 115 with each other in the example shown in FIG. 14, it may secure any other element, such as the panel 101 and the display device 110, with the casing 115.

Embodiment 4

Figure 15:
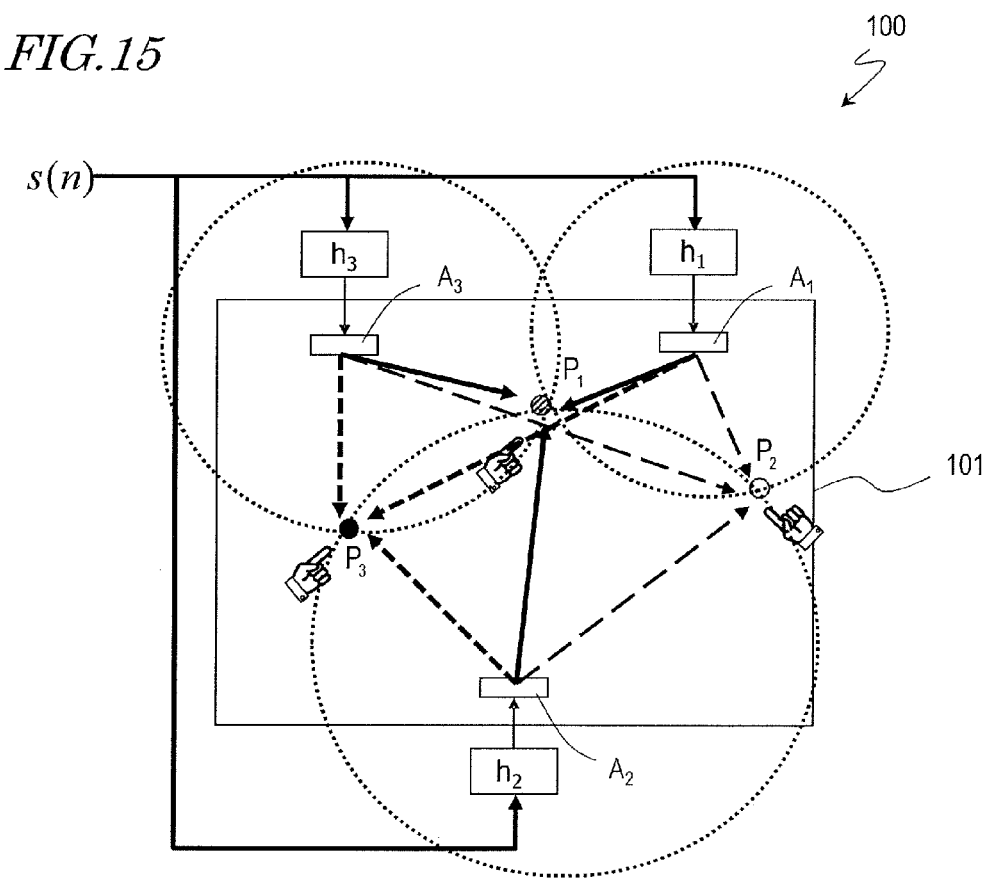
FIG. 15 is a diagram showing an electronic device according to an embodiment.

FIG. 15 is a diagram showing an electronic device 100 according to Embodiment 4. The electronic device 100 according to Embodiment 4 is different from the electronic device 100 of Embodiment 1 in that the number of vibrators is three. The embodiment will now be described while focusing on what is different from the electronic device 100 of Embodiment 1.

In the present embodiment, three vibrators $A_1$, $A_2$, and $A_3$ are arranged in a symmetric manner with respect to the panel 101. The vibrators $A_1$, $A_2$ and $A_3$ receive drive signals that are generated by filtering the tactile sensation signal s(n) through filters $h_1$, $h_2$ and $h_3$, and the vibrators $A_1$, $A_2$ and $A_3$ vibrate the panel 101. In the present embodiment, since the number of vibrators is three, it is possible to present a different vibration at each of three touch positions $P_1$, $P_2$ and $P_3$. For example, it is possible to present a vibration at one touch position $P_1$, while presenting no vibration at the other two touch positions $P_2$ and $P_3$.

Embodiment 5

An electronic device according to Embodiment 5 is different from the electronic device of Embodiment 1 in that the electronic device allows for a vibration of such an intensity that is difficult for a user to sense at the second touch position so as to reduce the energy for driving the vibrators or increase the vibration intensity at the first touch position. The electronic device according to the present embodiment will now be described while focusing on what is different from Embodiment 1.

<Device Configuration>

Figure 16:
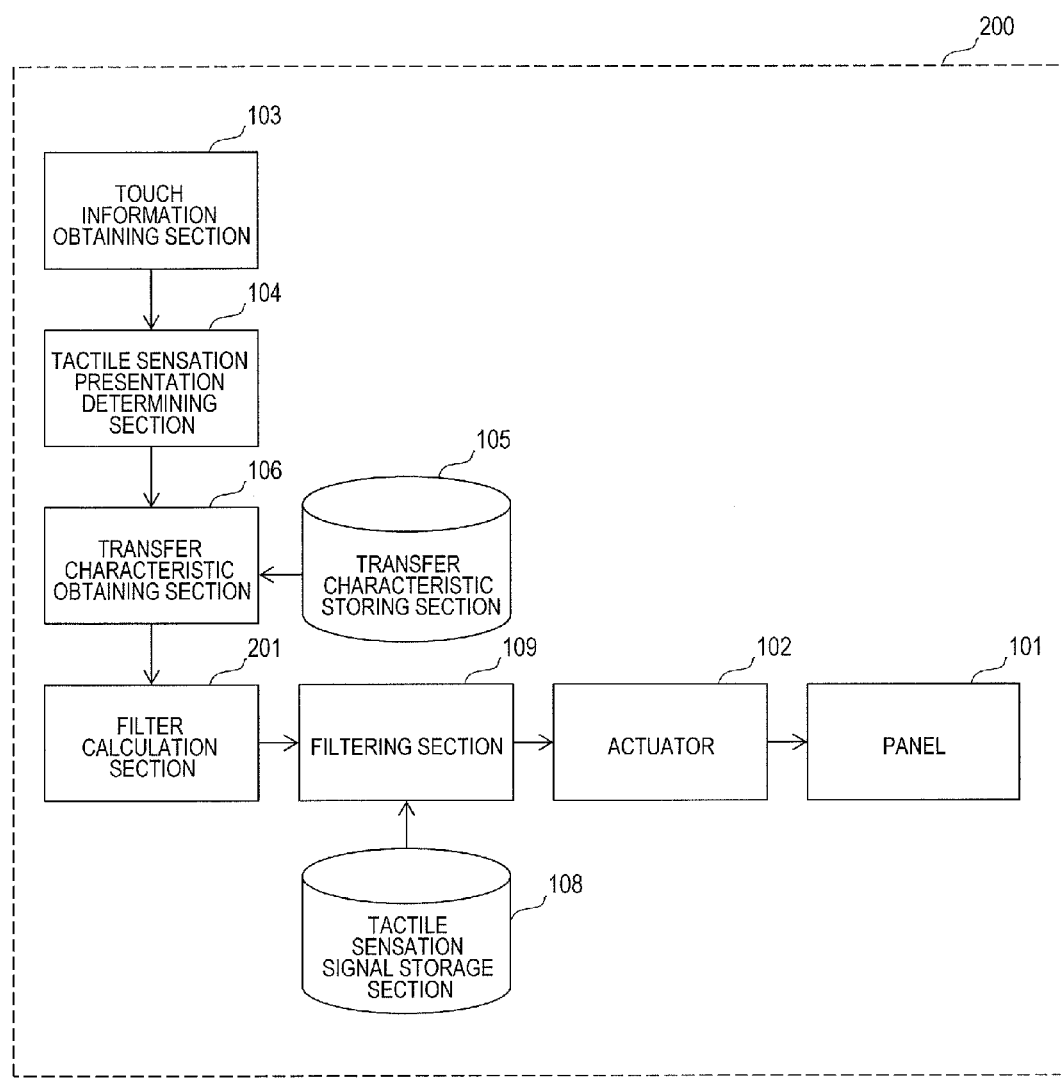
FIG. 16 is a diagram showing an electronic device according to an embodiment.

FIG. 16 is a diagram showing a functional configuration of an electronic device 200 according to Embodiment 5. Note that in FIG. 16, like elements to those of FIG. 2 are denoted by like reference numerals and may not be described below.

As shown in FIG. 16, the electronic device 200 includes the panel 101, the plurality of vibrators 102, the touch information obtaining section 103, the tactile sensation presentation determining section 104, the transfer characteristic storing section 105, the transfer characteristic obtaining section 106, a filter calculation section 201, the tactile sensation signal storage section 108, and the filtering section 109. The filter calculation section 201, which is a difference from the electronic device of Embodiment 1, will now be described.

<Filter Calculation Section 201>

The filter calculation section 201 calculates a filter so that the sum-of-product in frequency domain between the filter and the transfer characteristic from each vibrator 102 to the first touch position represents the impulse, and the sum-of-product in frequency domain between the filter and the transfer characteristic from each vibrator 102 to the second touch position represents a response signal that is less than or equal to a predetermined vibration intensity.

That is, the filter calculation section 201 calculates a filter by using a formula that is obtained by modifying the filter calculating formula in frequency domain shown in Embodiment 1.

In Embodiment 1, the filter calculation section 107 calculates a filter H as shown in Expression 2 by using a response D shown in Expression 4.

[Exp. 4]

$$D = \begin{bmatrix} 1 \\ 0 \\ \vdots \end{bmatrix} \quad (4)$$

On the other hand, in the present embodiment, the filter calculation section 201 calculates a filter H by using a response D shown in Expression 5. That is, the filter calculation section 201 allows for a vibration whose amplitude is $a_j$ and whose phase is $\theta^j$, as a vibration at the second touch position.

Thus, the filter calculation section 201 calculates a filter H such that the response at the first touch position is "1", and the amplitude of the response at the second touch position is $a_j$. The phase at the first touch position and the phase at the second touch position do not always need to coincide with each other. Therefore, any value can be used as the phase $\theta_j$ at the second touch position.

[Exp. 5]

$$D = \begin{bmatrix} 1 \\ a_2 \exp(j\theta_2) \\ \vdots \\ a_m \exp(j\theta_m) \end{bmatrix} \quad (5)$$

Thus, as the target response D is determined as shown in Expression 5, the filter calculation section 201 calculates the filter H by Expression 6 for the frequency ω as in Embodiment 1.

[Exp. 6]

$$H_{a_j\theta_j} = G^*D \quad (6)$$

If the vibration intensity at the second touch position is fixed (e.g., $a_j$=0.1), the filter H is dependent on only the phase $\theta_1$ of the response signal at the second touch position in Expression 6.

In view of this, the filter calculation section 201 calculates a plurality of filter candidates by varying the phase of the response signal, and obtains, as the filter to be used in filtering, one of the plurality of filter candidates with which it is possible to obtain a drive signal that is less than or equal to a predetermined vibration intensity through filtering. Note that while the filter calculation section 201 changes the phase of the response signal herein, it may change the amplitude of the response signal as long as a predetermined amplitude is not exceeded. The filter calculation section 201 may change both the amplitude and the phase of the response signal.

Note that the filter calculation section 201 may determine a filter based on the vibration intensity at the first touch position, but not on the vibration intensity of the drive signal. A method for determining a filter based on the vibration intensity at the first touch position will be described below.

The vibration intensity (amplitude) at the first touch position of the response signal, which is obtained through the filter calculated by Expression 6, is calculated as shown in Expression 7.

[Exp. 7]

$$A_{\theta_j} = \left| \sum_i G_{ij} \cdot H^i_{a_j\theta_j} \right| \quad (7)$$

Here, the magnitude of the input signal to an vibrator (i) is $|H_{a_j\theta_j}|$. Now, consider a case where the intensity $V_0$ of a signal that can be input to an vibrator is predetermined. That is, consider a case where there is the upper limit for the input voltage or the input power. The vibration intensity at the first touch position is calculated as shown in Expression 8.

[Exp. 8]

$$A_{\theta_j} = \frac{V_0}{V_{a_j\theta_j}} \left| \sum_i G_{ij} \cdot H^i_{a_j\theta_j} \right| \quad (8)$$

Here, $V_{a_j\theta_j}$ is represented by Expression 9.

[Exp. 9]

$$V_{a_j\theta_j} = \max_i \left( |H^i_{a_j\theta_j}| \right) \quad (9)$$

Here, the filter calculation section 201 searches for a phase θ that maximizes the vibration intensity A at the first touch position, while varying the phase $\theta_j$ at the second touch position, as shown in Expression 10. There is no particular limitation on how to solve Expression 10. For example, it is possible to obtain the optimal solution by using a numerical analysis approach such as the Newton's method.

[Exp. 10]

$$\hat{\theta}_j = \arg\max_{\theta_j} A_{\theta_j} \quad (10)$$

The filter calculation section 201 calculates the filter H(ω) as shown in Expression 11 by substituting the phase calculated in accordance with Expression 10 into Expression 6.

The filter H(ω) thus obtained is such a filter, from among a plurality of filters corresponding to a plurality of phases, that gives the highest vibration intensity at the first touch position.

[Exp. 11]

$$H(\omega) = H_{a\hat{\theta}j} \quad (11)$$

The frequency ω may be a predetermined frequency, or one may determine the frequency $\omega_0$ such that Expression 12 is minimized.

[Exp. 12]

$$\omega_0 = \underset{\omega}{\mathrm{argmin}} |H(\omega)| \quad (12)$$

Note that while the same fixed value is set as the vibration intensities at the second touch position to be given by different vibrators 102 in the method described above, a different value may be set for each individual vibrator. In such a case, it is possible to individually set the degree of allowance for the vibration intensities at the second touch position to be given by different vibrators 102, but the amount of computation for searching for the optimal phase increases.

While the phase at the second touch position to be given by each vibrator 102 is individually set according to the method described above, the same phase may be used as the phase to be given by each vibrator 102 at the second touch position. In such a case, there is an advantageous effect that it is possible to save the amount of computation for calculating the optimal phase.

<Operation>

Figure 17:
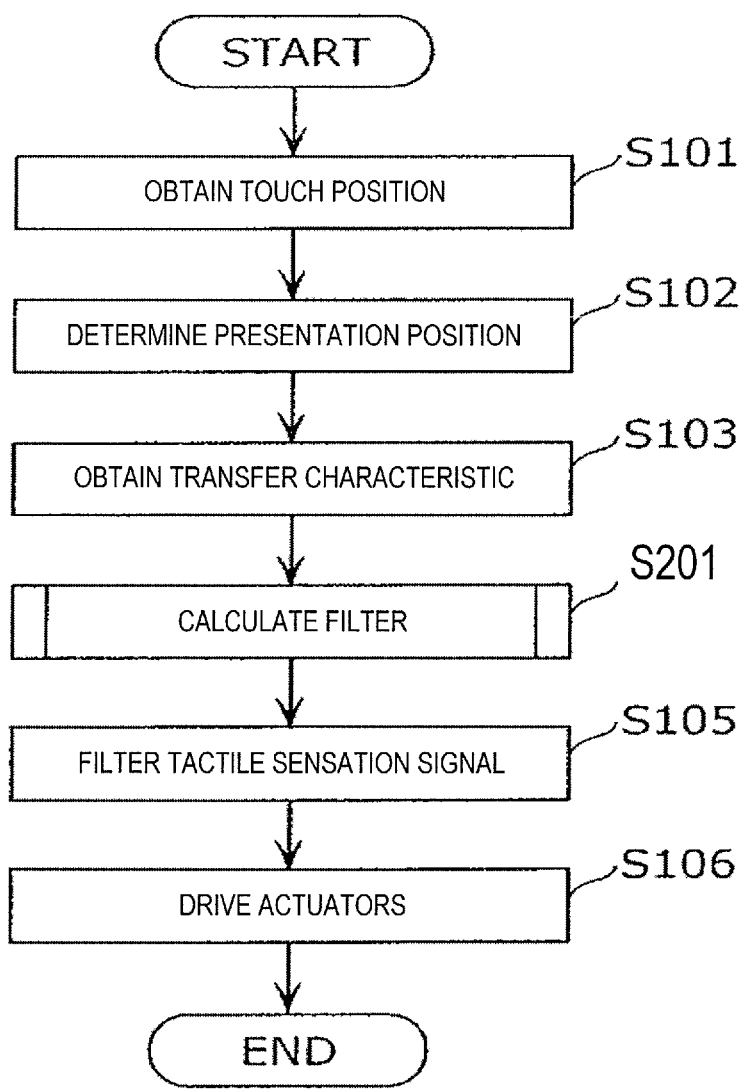
FIG. 17 is a flow chart showing an operation of an electronic device according to an embodiment.

Next, the operation of each element of the electronic device 200 having such a configuration will be described. FIG. 17 is a flow chart showing a process operation of the electronic device 200 of the present embodiment. Note that in FIG. 17, like steps to those of FIG. 6 are denoted by like reference numerals and may not be described below.

The filter calculation section 201 calculates a filter based on a condition that allows for such a vibration that cannot be sensed by a user at the second touch position (S201). Specifically, the filter calculation section 201 calculates a filter so that the sum-of-product in frequency domain between the filter and the transfer characteristic from each vibrator 102 to the first touch position represents the impulse, and the sum-of-product in frequency domain between the filter and the transfer characteristic from each vibrator 102 to the second touch position represents a response signal that is less than or equal to a predetermined vibration intensity. More specifically, the filter calculation section 201 calculates a filter as shown in FIG. 18, for example.

Figure 18:
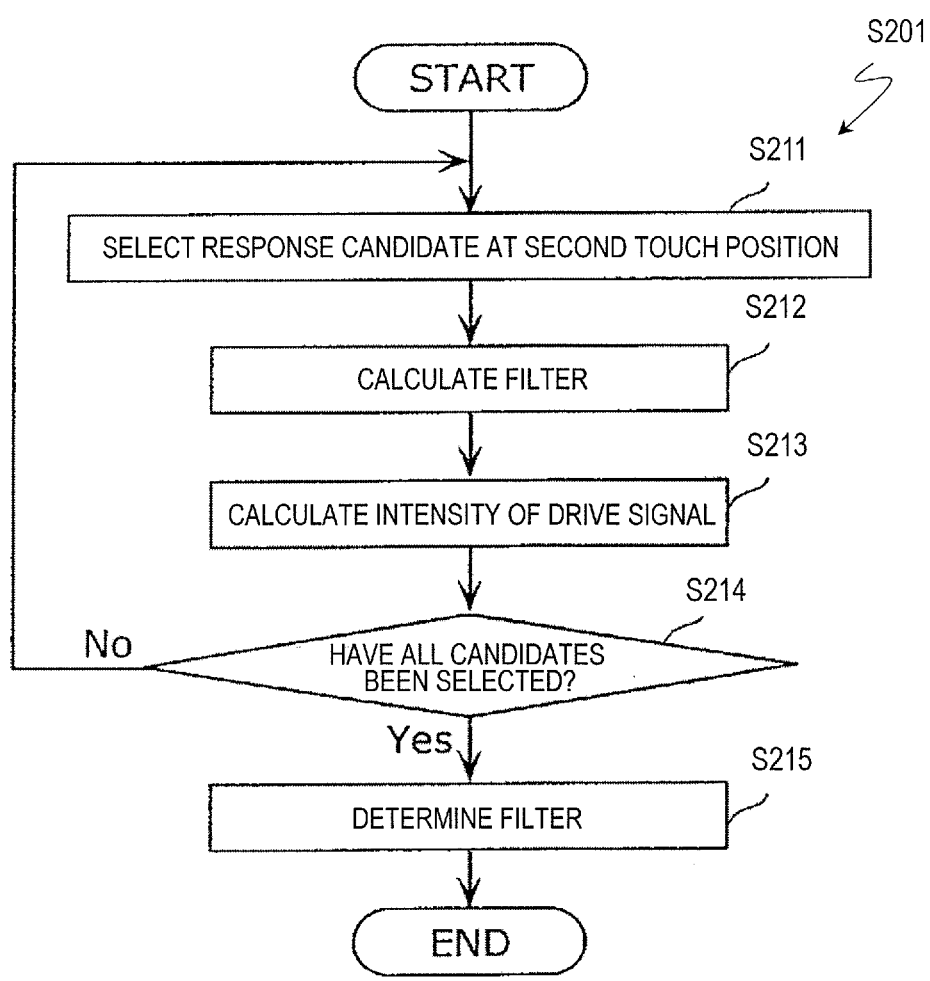
FIG. 18 is a flow chart showing an operation of an electronic device according to an embodiment.

FIG. 18 is a flow chart showing a process operation of the filter calculation section 201 of the present embodiment.

First, the filter calculation section 201 selects, from among a plurality of response signals candidates less than or equal to a predetermined vibration intensity, one response signal candidate that has not yet been selected (S211). The plurality of response signal candidates are different from one another in terms of at least one of the vibration intensity and the phase.

Next, the filter calculation section 201 calculates a filter by using the selected response signal candidate (S212). Specifically, the filter calculation section 201 calculates a filter as shown in Expression 11.

Then, the filter calculation section 201 calculates a vibration intensity of a drive signal that is obtained by filtering the tactile sensation signal by using the calculated filter (S213). Specifically, the filter calculation section 201 calculates, as the vibration intensity, a statistically representative value (e.g., mean, median or maximum value, etc.) of the amplitudes of a plurality of drive signals for a plurality of vibrators 102.

Next, the filter calculation section 201 determines whether or not all the response signals have been selected in step S211 (S214). Here, if any of the response signals has not been selected (No in S214), control returns to the process of step S211.

On the other hand, if all the response signals have been selected (Yes in S214), the filter calculation section 201 determines, as the filter to be used in filtering in step S105, a filter that gives the minimum vibration intensity, among a plurality of vibration intensities calculated in step S214 (S215).

Note that the filter calculation section 201 may determine, as the filter to be used in filtering in step S105, a filter that gives a vibration intensity less than or equal to a predetermined vibration intensity, among a plurality of vibration intensities. The predetermined vibration intensity may be determined for example based on the maximum driving power of the vibrator 102, or the like. In such a case, when a vibration intensity less than the predetermined vibration intensity is obtained, the filter calculation section 201 may forcibly exit the loop process from step S211 to step S214 and execute step S215.

Figure 19:
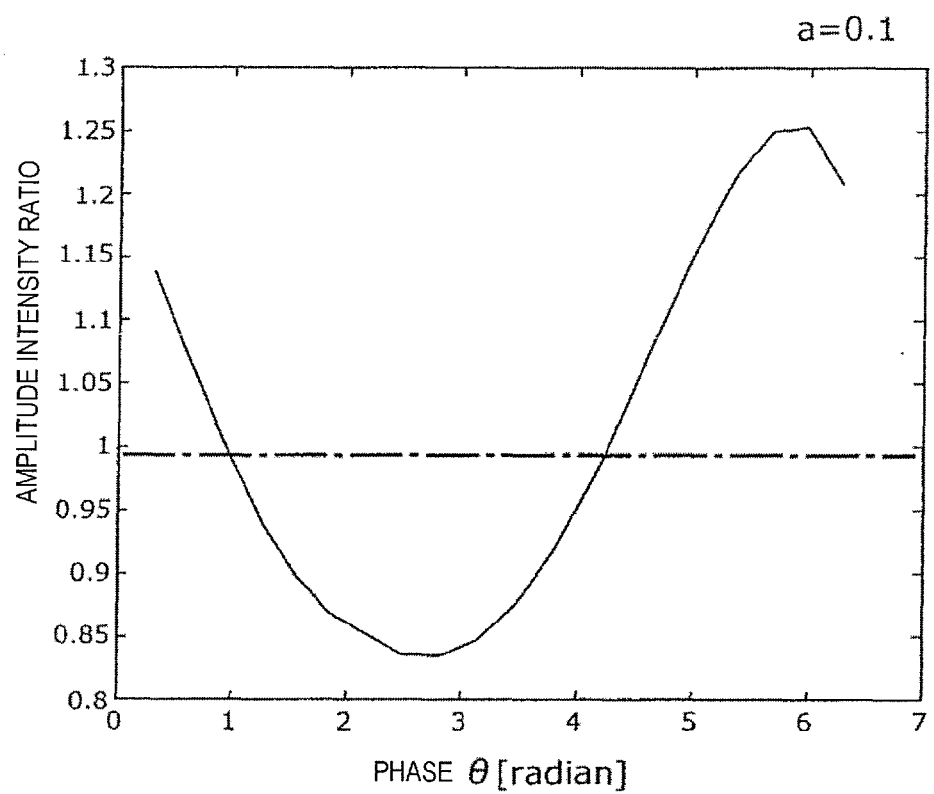
FIG. 19 is a graph showing how the vibration intensity at the first touch position changes with respect to the phase of the response signal at the second touch position according to an embodiment.

FIG. 19 is a graph showing an example of how the vibration intensity at the first touch position changes with respect to the phase of the response signal at the second touch position. Specifically, the graph of FIG. 19 shows the vibration intensity at the first touch position to be obtained while varying the phase in Expression 10 with the intensity of the input signal to the vibrator being constant, where the vibration intensity at the second touch position is set to a=0.1. The horizontal axis represents the phase θ of the vibration at the second touch position. The vertical axis represents the relative vibration intensity where the vibration intensity at the first touch position is "1" when the amplitude at the second touch position is "0".

As can be seen from FIG. 19, the relative intensity at the first touch position for the optimal phase is about 1.25, indicating an increase in the vibration intensity at the presenting position (first touch position).

Advantageous Effect

As described above, with the electronic device 200 of the present embodiment, it is possible to present a tactile sensation at a presenting position while presenting a tactile sensation smaller than that for the presenting position at a non-presenting position. Therefore, for a touch in a multi-touch operation for which a tactile sensation needs to be presented, it is possible to present a tactile sensation that is different from that for the other touches in the multi-touch operation, thus realizing an appropriate tactile feedback. That is, it is possible to reduce the possibility of confusion by unnecessarily presenting tactile sensations. It is possible to decrease the vibration intensity of the drive signal by allowing for such a slight vibration that cannot be sensed by a user to be given at the non-presenting position (second touch position). That is, it is possible to improve the energy efficiency, and it is possible to efficiently present a tactile sensation. Where the vibration intensity of the drive signal is not decreased, it is possible to increase the vibration intensity at the presenting position (first touch position), and it is possible to present a stronger tactile sensation.

Note that while the vibration intensity at the second touch position is defined by Expression 5 in the present embodiment, it may be defined based on the vibration intensity ratio between the first touch position and the second touch position. For example, in order to set the vibration intensity ratio between the first touch position and the second touch position at 10:1, the vibration intensity at the second touch position can be set at "0.1" in Expression 5.

Embodiment 6

An electronic device according to Embodiment 6 is different from the electronic device 100 of Embodiment 1 in that it is possible to increase the intensity of the vibration of the panel at the touch position (presenting position) by controlling the vibration of the panel at a control position in the vicinity of the touch position in accordance with the tactile sensation signal. The electronic device of the present embodiment will now be described while focusing on what is different from Embodiment 1.

<Device Configuration>

Figure 20:
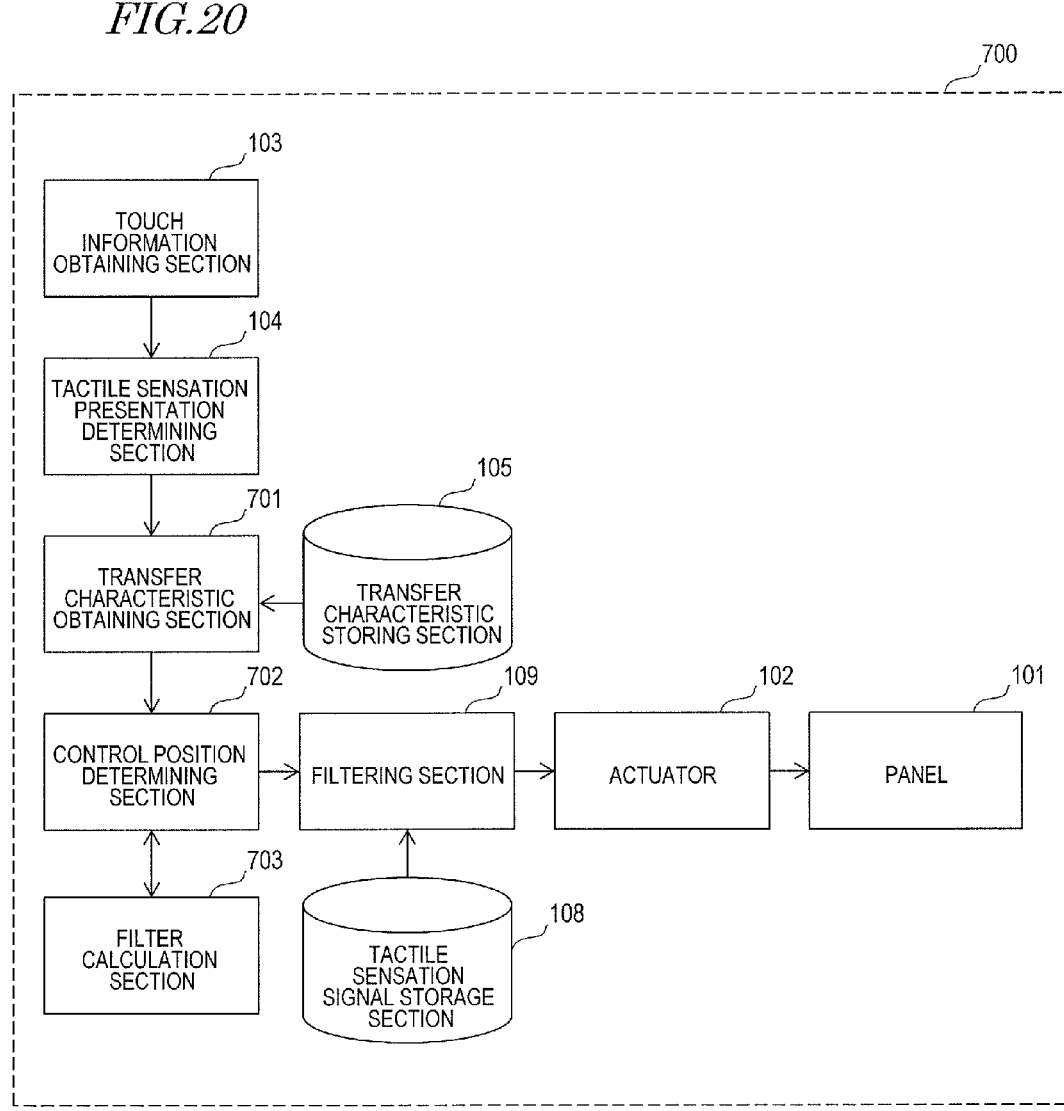
FIG. 20 is a diagram showing an electronic device according to an embodiment.

FIG. 20 shows a functional configuration of an electronic device 700 according to Embodiment 6. Note that in FIG. 20, like elements to those of FIG. 2 are denoted by like reference numerals and may not be described below.

As shown in FIG. 20, the electronic device 700 includes the panel 101, the plurality of vibrators 102, the touch information obtaining section 103, the tactile sensation presentation determining section 104, the transfer characteristic storing section 105, a transfer characteristic obtaining section 701, a control position determining section 702, a filter calculation section 703, the tactile sensation signal storage section 108, and the filtering section 109.

<Transfer Characteristic Obtaining Section 701>

The transfer characteristic obtaining section 701 obtains, from the transfer characteristic storing section 105, a transfer characteristic from each vibrator 102 to the first control position and a transfer characteristic from each vibrator 102 to the second control position. The first control position is the first touch position or a position in the vicinity thereof. Specifically, the first control position is a position within an area of a predetermined range including the first touch position therein (hereinafter referred to as the "first area"). The second control position is the second touch position or a position in the vicinity thereof. Specifically, the second control position is a position within an area of a predetermined range including the second touch position therein (hereinafter referred to as the "second area").

For example, the transfer characteristic obtaining section 701 obtains the transfer characteristic from each vibrator 102 to each of a plurality of first candidate positions, which are candidate first control positions within the first area. For example, the transfer characteristic obtaining section 701 obtains the transfer characteristic from each vibrator 102 to each of a plurality of second candidate positions, which are candidate second control positions within the second area.

<Control Position Determining Section 702>

The control position determining section 702 determines a first control position from within the first area. The control position determining section 702 also determines a second control position from within the second area.

Specifically, the control position determining section 702 may determine the second touch position as the second control position, for example. Moreover, the control position determining section 702 may for example calculate, for each of a plurality of first candidate positions within the first area, the vibration intensity at the first touch position when driving each vibrator 102 by using a drive signal that is generated by using the transfer characteristic from each vibrator 102 to the first candidate position and the transfer characteristic from each vibrator 102 to the second control position, so as to determine, as the first control position, one of the first candidate positions that gives the highest vibration intensity.

The vibration intensity is a value representing the magnitude of the vibration. For example, the vibration intensity may be a value representing the amplitude level. For example, the vibration intensity may be a value representing a relative amplitude level with respect to a reference amplitude level.

<Filter Calculation Section 703>

The filter calculation section 703 calculates a filter for generating, by filtering an intended tactile sensation signal, a drive signal for driving each vibrator 102 so that the panel 101 vibrates in accordance with the intended tactile sensation signal at the first control position while the panel 101 vibrates less at the second control position than the first control position. Specifically, the filter calculation section 703 calculates a filter by the filter calculation method of Embodiment 1 while the first touch position and the second touch position are substituted with the first control position and the second control position.

<Operation>

Figure 21:
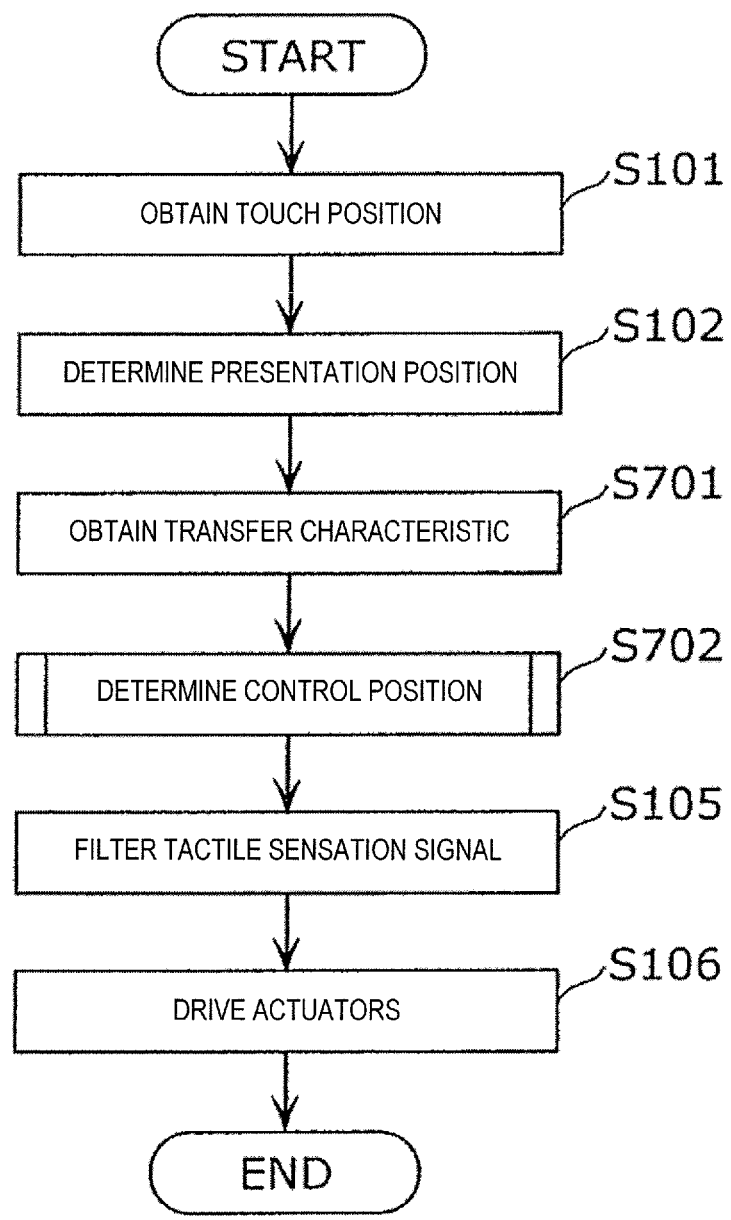
FIG. 21 is a flow chart showing an operation of an electronic device according to an embodiment.

Next, the operation of the electronic device 700 having such a configuration will be described in detail. FIG. 21 is a flow chart showing a process operation of the electronic device 700 according to Embodiment 6. Note that in FIG. 21, like steps to those of FIG. 6 are denoted by like reference numerals and may not be described below. The following description is directed to a case where the second control position is the second touch position.

The transfer characteristic obtaining section 701 obtains the transfer characteristic from each vibrator 102 to each first candidate position, and the transfer characteristic from each vibrator 102 to the second control position (second touch position) (S701).

Figure 23:
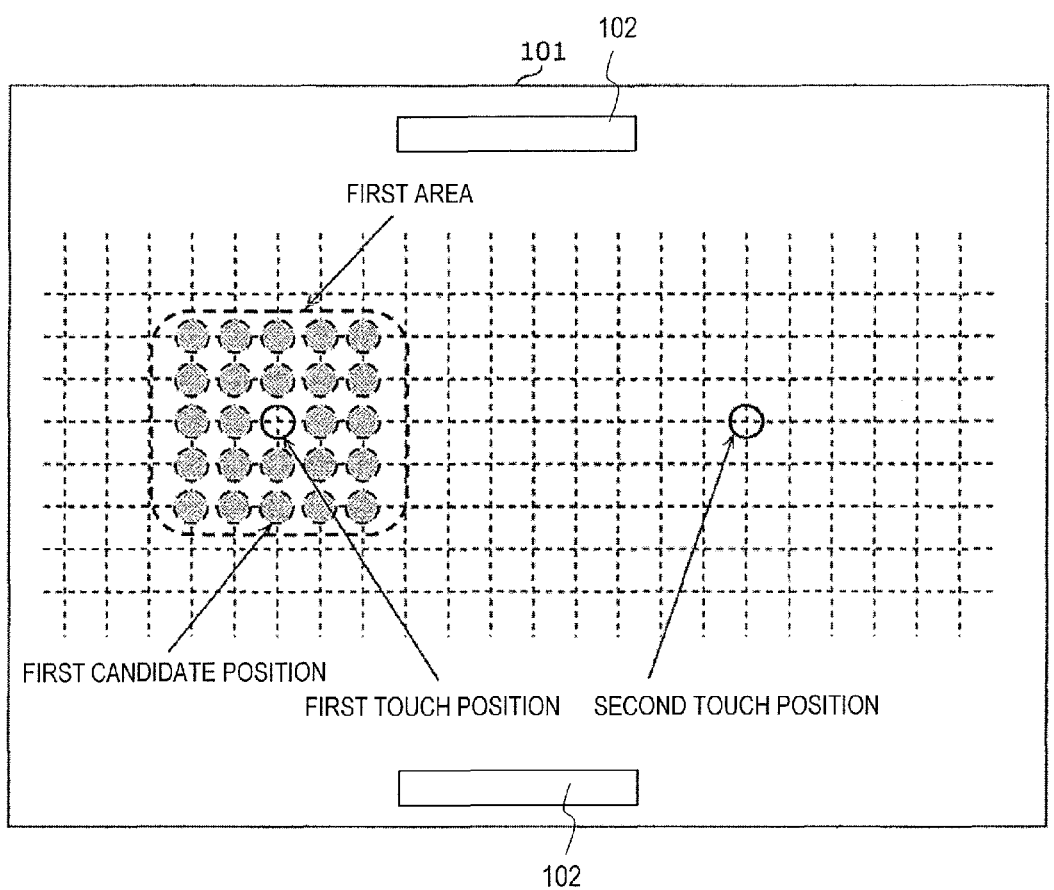
FIG. 23 is a diagram showing a plurality of candidate positions according to an embodiment.

FIG. 23 is a diagram showing an example of a plurality of first candidate positions. Positions in the vicinity of the first touch position are used as the plurality of first candidate positions as shown in FIG. 23, for example. That is, a plurality of positions within a first area of a predetermined range including the first touch position therein are used as the plurality of first candidate positions. Note that, for example, positions whose distance to the first touch position is within a predetermined threshold may be used as the plurality of first candidate positions. For example, positions within a rectangular area of a predetermined size that is centered about the first touch position may be used as the plurality of first candidate positions.

Then, the control position determining section 702 determines the first control position from among a plurality of first candidate positions (S702). Specifically, the control position determining section 702 determines the first control position as shown in FIG. 22, for example.

Figure 22:
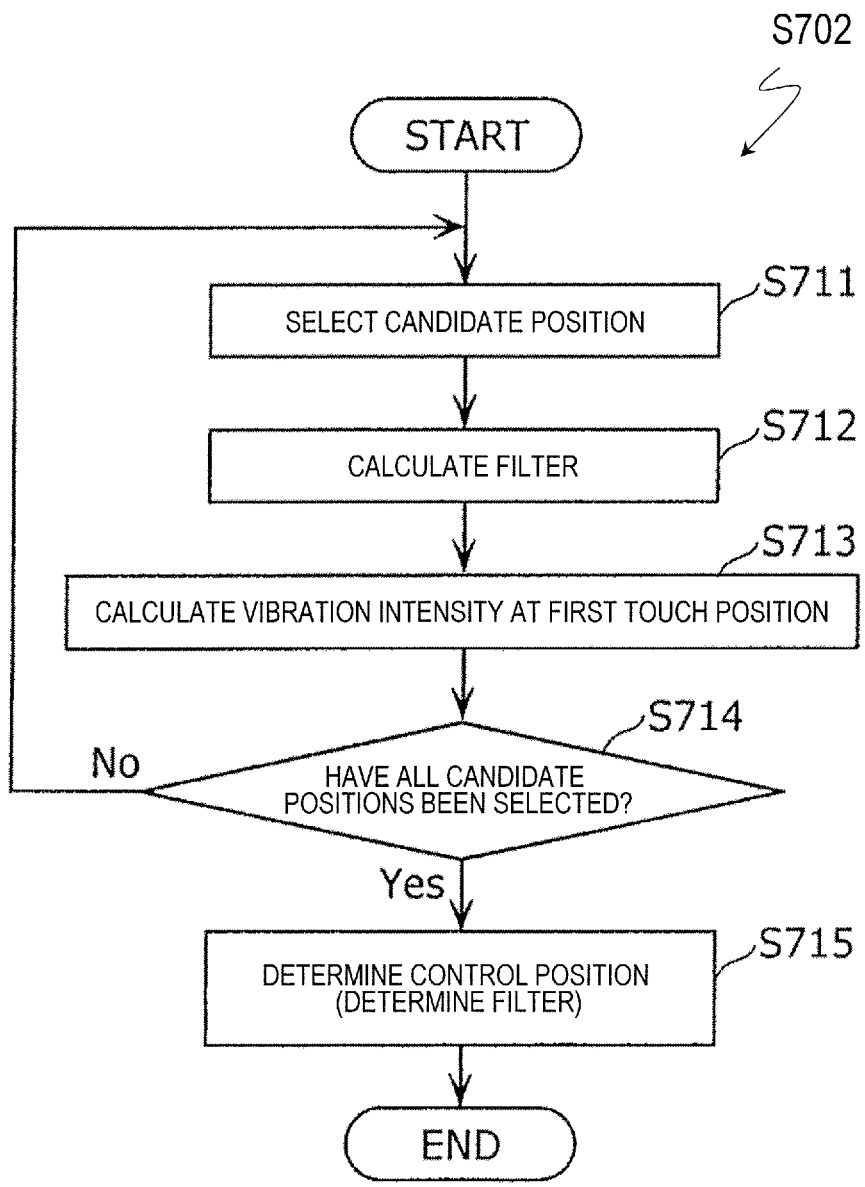
FIG. 22 is a flow chart showing an operation of an electronic device according to an embodiment.

FIG. 22 is a flow chart showing a process operation of the control position determining section 702 and the filter calculation section 703 according to Embodiment 6. FIG. 23 shows an example of a plurality of first candidate positions according to Embodiment 6. Note that in this example, i represents an vibrator, j represents the first touch position, and k represents a first candidate position.

The control position determining section 702 selects, from among a plurality of first candidate positions, one first candidate position that has not yet been selected (S711). Specifically, the control position determining section 702 selects one first candidate position in a predetermined order from among a plurality of first candidate positions within the first area shown in FIG. 23, for example.

Then, the filter calculation section 703 calculates a filter $H_i^k(\omega)$ by the method shown in Embodiment 1 by using the transfer characteristic from each vibrator 102 to the selected first candidate position and the transfer characteristic from each the vibrator 102 to the second control position (second touch position) (S712).

Then, the control position determining section 702 calculates the vibration intensity at the first touch position to be obtained when each vibrator 102 is driven by a drive signal generated by using the calculated filter (S713).

Specifically, for example, the control position determining section 702 calculates the vibration intensity at the first touch position by using the frequency $\omega_0$ of the tactile sensation signal, the calculated filter, and the transfer characteristic $G_{i,j}$ of the panel 101 from each vibrator 102 to the selected first candidate position. More specifically, the control position determining section 702 calculates the vibration intensity $A_k$ at the first touch position as shown in Expression 13, for example.

[Exp. 13]

$$A_k = \left| \sum_i G_{i,j} \cdot H_i^k(\omega_0) \right| \quad (13)$$

Here, $H_i^k(\omega)$ represents a filter associated with a first candidate position (k) and an vibrator (i). Moreover, $G_{i,j}$ represents the transfer characteristic from an vibrator (i) to the first touch position (j).

For example, the control position determining section 702 may select, from among any frequencies, such a frequency that the filter gain is minimized, rather than specifying a frequency. Then, the control position determining section 702 may calculate the vibration intensity at the first touch position by using the selected frequency. In such a case, the control position determining section 702 calculates the vibration intensity in accordance with Expression 14 and Expression 15.

[Exp. 14]

$$\hat{\omega} = \arg\min_{\omega}(|H_i^k(\omega)|) \quad (14)$$

[Exp. 15]

$$A_k = \left| \sum_i G_{i,j} \cdot H_i^k(\hat{\omega}) \right| \quad (15)$$

That is, the control position determining section 702 first determines such a frequency that the filter gain is minimized by using Expression 14. Then, the control position determining section 702 calculates the vibration intensity $A_k$ at the first touch position by using a filter coefficient at the determined frequency as shown in Expression 15.

Then, the control position determining section 702 determines whether or not all the first candidate positions have been selected in step S711 (S714). That is, the control position determining section 702 determines whether or not the vibration intensity $A_k$ has been calculated for all the first candidate positions. If any of the first candidate positions has not been selected (No in S714), control returns to the process of step S711.

On the other hand, if all the first candidate positions have been selected (Yes in S714), the control position determining section 702 determines, as the first control position, such a first candidate position that the highest vibration intensity is obtained, from among a plurality of vibration intensities calculated in step S714, as shown in Expression 16 (S715). Then, the control position determining section 702 determines a filter associated with the determined first control position, as the filter to be used in filtering in step S105.

[Exp. 16]

$$\hat{k} = \arg\max_{k} A_k \quad (16)$$

Note that the control position determining section 702 does not have to determine, as the first control position, such a first candidate position that the highest vibration intensity is obtained. For example, the control position determining section 702 may determine, as the first control position, such a first candidate position that a vibration intensity higher than a predetermined vibration intensity is obtained. In such a case, when a vibration intensity higher than the predetermined vibration intensity is calculated, the control position determining section 702 may forcibly exit the loop process from step S711 to step S714 and execute step S715.

Figure 24:
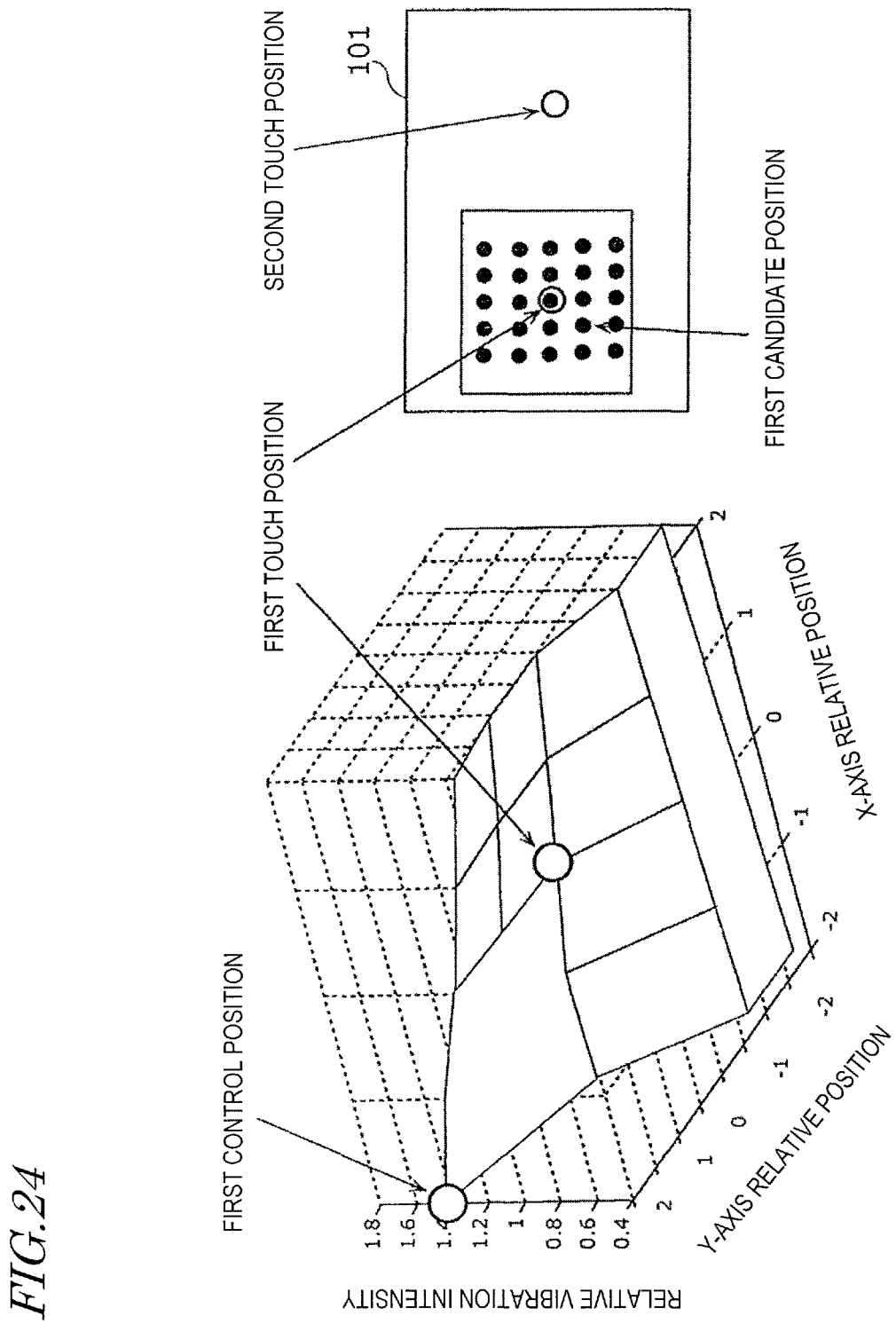
FIG. 24 is a diagram showing the vibration intensity at touch positions corresponding to a plurality of candidate positions according to an embodiment.

FIG. 24 shows simulation results of the vibration intensity at first touch positions corresponding to first candidate positions according to Embodiment 6. Specifically, FIG. 24 shows relative vibration intensities to be obtained at the first touch position when driving the vibrators 102 using drive signals generated by using the first candidate positions in the vicinity of the first touch position.

Herein, the relative vibration intensity is the ratio of the amplitude at the first touch position corresponding to each first candidate position with respect to the amplitude at the first touch position when the first touch position is selected as the first candidate position. The relative position is a position relative to the first touch position.

As can be seen from FIG. 24, the vibration intensity at the first touch position is maximized (about 1.4) at the first candidate position [−2,2]. That is, the first candidate position [−2,2] is determined as the first control position in FIG. 24.

Note that the tactile sensation signal s(n) is generated as shown in Expression 17 by using the frequency $\omega$, which is used in step S712.

[Exp. 17]

$$s(n) = \sin(2\pi f_m n T_s)\sin(\omega n T_s) \quad (17)$$

$$f_m = \frac{\omega}{4\pi r}$$

Advantageous Effect

As described above, with the electronic device 700 of the present embodiment, it is possible based on the first touch position and the second touch position to determine, as the first control position, such a first candidate position that the vibration intensity at the first touch position is maximized from among a plurality of first candidate positions in the vicinity of the first touch position. That is, with the electronic device 700, since it is possible to increase the vibration intensity at the first touch position, it is possible to present a strong tactile sensation to a user. Alternatively, with the electronic device 700, since it is possible to reduce the amount of energy required for driving vibrators for realizing a vibration intensity required at the first touch position, it is possible to increase the energy efficiency.

Note that while the second touch position is determined as the second control position in the present embodiment, a position in the vicinity of the second touch position may be determined as the second control position. In such a case, for example, the control position determining section 702 determines the first touch position as the first control position, and calculates the vibration intensities to be obtained at the first touch position when driving the vibrators using drive signals generated, for each of a plurality of second candidate positions within the second area, by using the transfer characteristic from each vibrator to the first control position and the transfer characteristic from each vibrator to the second candidate position, so as to determine, as the second control position, such a second candidate position that the calculated vibration intensity is greater than or equal to a predetermined vibration intensity.

Thus, when the second control position is determined, the second touch position may be shifted from the second control position. In such a case, while a vibration occurs also at the second touch position, the vibration intensity at the first touch position can be made greater than that.

For example, the control position determining section 702 may calculate, for each combination between a plurality of first candidate positions within the first area and a plurality of second candidate positions within the second area, the vibration intensities to be obtained at the first touch position when driving the vibrators 102 using drive signals generated by using the transfer characteristic from each vibrator 102 to the first candidate position and the transfer characteristic from each vibrator 102 to the second candidate position. Then, for example, the control position determining section 702 may determine the first candidate position and the second candidate position such that the calculated vibration intensity is maximized as the first control position and the second control position, respectively. In such a case, while a vibration occurs also at the second touch position, the vibration intensity at the first touch position can be made greater than that.

Embodiments 1 to 6 have been described above as examples of the technique disclosed herein. However, the technique of this disclosure is not limited thereto, but is also applicable to other embodiments in which changes, replacements, additions, omissions, etc., are made as necessary. Different ones of the elements described in Embodiments 1 to 6 above may be combined together to obtain a new embodiment.

Other embodiments are illustrated hereinbelow.

While the embodiments described above are directed to a tablet-type electronic device as an example electronic device, the electronic device is not limited thereto. For example, the electronic device may be any electronic device including a touch panel, such as a mobile telephone, a PDA, a game device, a car navigation, an ATM, etc.

While the electronic device includes a display device in the embodiments described above, the electronic device does not need to include a display device. For example, it may be an electronic device such as a touch pad.

While a touch panel has been discussed above as the control section in the embodiments described above, the control section is not limited thereto. For example, it may be a pointing device such as a mouse. In such a case, a vibrator 13 is provided in a mouse to vibrate the mouse.

While the embodiments described above are directed to examples where vibrators are attached to the panel, vibrators may be attached to the casing, the frame, or the like.

While the vibrators are piezoelectric elements in the embodiments described above, they may be vibrators using an electrostatic force, and vibrations may be propagated by other methods such as a VCM or a vibration motor. Alternatively, thin-film transparent piezoelectric members may be formed on the panel by a method such as sputtering, and used as the vibrators.

While the filter is calculated by an inverse function in frequency domain in the embodiments described above, the filter may be calculated by any other method. For example, a calculation described in International Publication WO2013/161163 may be employed. The disclosure of International Publication WO2013/161163 is herein incorporated by reference.

While the transfer functions are measured in advance, they may be detected by other methods.

While flexural vibration is illustrated as a type of vibration in the embodiments described above, it may be vibration caused by compressional wave or surface wave.

While the panel and the display device are illustrated as being separate from each other in the embodiments described above, they may be connected together by optical bonding, or the like.

While the panel and the display device are separate members in the embodiments described above, the panel and the display device may be provided as an integral member. For example, an in-cell type touch panel may be employed where the touch panel function is integrated inside a liquid crystal panel, or an on-cell type touch panel may be employed where the touch panel function is integrated on the surface of a liquid crystal panel. In such a case, vibrators may be provided on the back surface of the display device.

While it is stated herein that the panel, the filtering section, the transfer characteristic storing section, etc., may be provided integral together, they may be separate from one another and signals may be transmitted therebetween by communication.

While the vibration-propagating material has been described as being a glass or PC, which are rigid materials, the propagating material may be any material, e.g., a soft material such as a film, a skin or a rubber, a liquid such as water, a gel material, a gas, etc., as long as it is capable of propagating a vibration and on which a touch position can be defined.

While a tactile sensation is presented by generating a vibration in the embodiments described above, the technique of the present disclosure is not limited thereto. In addition to a vibration, tactile sensations may be presented by other methods, e.g., a variation of friction using static electricity, a skin stimulation using electric current, and a variation of screen shape using liquid. In addition to presenting a tactile sensation, screen display, sound, light, heat, etc., may be used in combination as necessary.

Note that the operation of the electronic device described above may be implemented by means of hardware or software. A program implementing such a control operation is stored, for example, in an internal memory of a microcomputer or in a ROM. Such a computer program may be installed onto the electronic device from a storage medium (an optical disc, a semiconductor memory, etc.) storing the computer program, or may be downloaded via a telecommunications network such as the Internet.

As described above, an electronic device according to one embodiment of the present disclosure includes: a panel 101 touched by a user; a plurality of vibrators 102 for vibrating the panel 101; and a vibration controller 109 for controlling the plurality of vibrators 102 so that when a plurality of positions of the panel 101 are simultaneously touched by the user, a vibration at a first touch position of the plurality of touch positions is greater than a vibration of a second touch position of the plurality of touch positions. The plurality of vibrators 102 include a first and a second vibrator 102. Where a distance between the first touch position and the first vibrator 102 is equal to a distance between the second touch position and the first vibrator 102, a transfer characteristic of vibration of the panel 101 between the first vibrator 102 and the first touch position is different from a transfer characteristic of vibration of the panel 101 between the first vibrator 102 and the second touch position.

For example, where a distance between the first touch position and the second vibrator 102 is equal to a distance between the second touch position and the second vibrator 102, a transfer characteristic of vibration of the panel 101 between the second vibrator 102 and the first touch position is different from a transfer characteristic of vibration of the panel 101 between the second vibrator 102 and the second touch position.

For example, the electronic device further includes a casing 115 for supporting the panel 101, wherein the panel 101 is secured to the casing 115 in an asymmetric manner with respect to a center of the panel 101.

For example, the electronic device further includes a casing 115 for supporting the panel 101, wherein the panel 101 is secured to the casing 115 in an asymmetric manner with respect to an axis that passes through a center of the panel 101 and that is parallel to a planar direction of the panel 101.

For example, the electronic device further includes a casing 115 for supporting the panel 101, wherein: the panel 101 is supported on the casing 115 with a securing member 121 interposed therebetween; and a shape of the securing member 121 is asymmetric with respect to a center of the panel 101.

For example, the electronic device further includes a casing 115 for supporting the panel 101, wherein: the panel 101 is supported on the casing 115 with a securing member 121 interposed therebetween; and a shape of the securing member 121 is asymmetric with respect to an axis that passes through a center of the panel 101 and that is parallel to a planar direction of the panel 101.

For example, the electronic device further includes a casing 115 for supporting the panel 101, wherein: the panel 101 is supported on the casing 115 with a securing member 121 interposed therebetween; and hardness of the securing member 121 is varied in an asymmetric manner with respect to a center of the panel 101.

For example, the electronic device further includes a casing 115 for supporting the panel 101, wherein: the panel 101 is supported on the casing 115 with a securing member 121 interposed therebetween; and hardness of the securing member 121 is varied in an asymmetric manner with respect to an axis that passes through a center of the panel 101 and that is parallel to a planar direction of the panel 101.

For example, the panel 101 has an asymmetric planar shape with respect to a center of the panel 101.

For example, the panel 101 has an asymmetric planar shape with respect to an axis that passes through a center of the panel 101 and that is parallel to a planar direction of the panel 101.

For example, the panel 101 has a thickness asymmetric with respect to a center of the panel 101.

For example, the panel 101 has a thickness asymmetric with respect to an axis that passes through a center of the panel 101 and that is vertical to a planar direction of the panel 101.

For example, the first and second vibrators 102 are arranged in a symmetric manner with respect to a center of the panel 101.

For example, the first and second vibrators 102 are arranged in a symmetric manner with respect to an axis that passes through a center of the panel 101 and that is parallel to a planar direction of the panel 101.

An electronic device according to one embodiment of the present disclosure includes: a panel 101 touched by a user; a plurality of vibrators 102 for vibrating the panel 101; and a vibration controller 109 for controlling the plurality of vibrators 102 so that when a plurality of positions of the panel 101 are simultaneously touched by the user, a vibration at a first touch position of the plurality of touch positions is greater than a vibration of a second touch position of the plurality of touch positions. The plurality of vibrators 102 include a first and a second vibrator 102. Where a distance between the first touch position and the first vibrator 102 is equal to a distance between the first touch position and the second vibrator 102, a transfer characteristic of vibration of the panel 101 between the first vibrator 102 and the first touch position is different from a transfer characteristic of vibration of the panel 101 between the second vibrator 102 and the first touch position.

For example, where a distance between the second touch position and the first vibrator 102 is equal to a distance between the second touch position and the second vibrator 102, a transfer characteristic of vibration of the panel 101 between the first vibrator 102 and the second touch position is different from a transfer characteristic of vibration of the panel 101 between the second vibrator 102 and the second touch position.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein. Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The technique of the present disclosure, capable of presenting different tactile sensations in response to a multi-touch operation, is applicable to user interfaces of TVs, digital still cameras, digital video cameras, personal computers, portable information terminals and mobile telephones, for example. It is also applicable to devices whose screen is simultaneously touched by a plurality of people, such as electronic blackboards and digital signage displays.

While the present invention has been described with respect to exemplary embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An electronic device comprising:
a panel touched by a user;
a plurality of vibrators that vibrate the panel; and
a vibration controller that controls the plurality of vibrators so that when a plurality of positions of the panel are simultaneously touched by the user, a vibration at a first touch position of the plurality of touch positions is greater than a vibration of a second touch position of the plurality of touch positions, wherein:
the plurality of vibrators include a first and a second vibrator; and
where a distance between the first touch position and the first vibrator is equal to a distance between the second touch position and the first vibrator,
a transfer characteristic of vibration of the panel between the first vibrator and the first touch position is different from a transfer characteristic of vibration of the panel between the first vibrator and the second touch position,
wherein the electronic device further comprises a casing that supports the panel, and
the panel is secured to the casing in an asymmetric manner with respect to a center of the panel.

2. The electronic device according to claim 1, wherein:
where a distance between the first touch position and the second vibrator is equal to a distance between the second touch position and the second vibrator,
a transfer characteristic of vibration of the panel between the second vibrator and the first touch position is different from a transfer characteristic of vibration of the panel between the second vibrator and the second touch position.

3. The electronic device according to claim 1,
wherein the panel is secured to the casing in an asymmetric manner with respect to an axis that passes through a center of the panel and that is parallel to a planar direction of the panel.

4. The electronic device according to claim 1, wherein the panel has an asymmetric planar shape with respect to a center of the panel.

5. The electronic device according to claim 1, wherein the panel has an asymmetric planar shape with respect to an axis that passes through a center of the panel and that is parallel to a planar direction of the panel.

6. The electronic device according to claim 1, wherein the panel has a thickness asymmetric with respect to a center of the panel.

7. The electronic device according to claim 1, wherein the panel has a thickness asymmetric with respect to an axis that passes through a center of the panel and that is vertical to a planar direction of the panel.

8. The electronic device according to claim 1, wherein the first and second vibrators are arranged in a symmetric manner with respect to a center of the panel.

9. The electronic device according to claim 1, wherein the first and second vibrators are arranged in a symmetric manner with respect to an axis that passes through a center of the panel and that is parallel to a planar direction of the panel.

10. An electronic device comprising:
a panel touched by a user;
a plurality of vibrators that vibrate the panel; and
a vibration controller that controls the plurality of vibrators so that when a plurality of positions of the panel are simultaneously touched by the user, a vibration at a first touch position of the plurality of touch positions is greater than a vibration of a second touch position of the plurality of touch positions, wherein:
the plurality of vibrators include a first and a second vibrator; and
where a distance between the first touch position and the first vibrator is equal to a distance between the second touch position and the first vibrator,
a transfer characteristic of vibration of the panel between the first vibrator and the first touch position is different from a transfer characteristic of vibration of the panel between the first vibrator and the second touch position,
wherein the electronic device further comprises a casing that supports the panel,
the panel is supported on the casing with a securing member interposed therebetween; and
a shape of the securing member is asymmetric with respect to a center of the panel.

11. The electronic device according to claim 10, wherein the panel is supported on the casing with a securing member interposed therebetween; and
the shape of the securing member is asymmetric with respect to an axis that passes through a center of the panel and that is parallel to a planar direction of the panel.

12. An electronic device comprising:
a panel touched by a user;
a plurality of vibrators that vibrate the panel; and
a vibration controller that controls the plurality of vibrators so that when a plurality of positions of the panel are simultaneously touched by the user, a vibration at a first touch position of the plurality of touch positions is greater than a vibration of a second touch position of the plurality of touch positions, wherein:
the plurality of vibrators include a first and a second vibrator; and
where a distance between the first touch position and the first vibrator is equal to a distance between the second touch position and the first vibrator,
a transfer characteristic of vibration of the panel between the first vibrator and the first touch position is different from a transfer characteristic of vibration of the panel between the first vibrator and the second touch position,
wherein the electronic device further comprises a casing that supports the panel,
the panel is supported on the casing with a securing member interposed therebetween; and
hardness of the securing member is varied in an asymmetric manner with respect to a center of the panel.

13. The electronic device according to claim 12, wherein the panel is supported on the casing with a securing member interposed therebetween; and
hardness of the securing member is varied in an asymmetric manner with respect to an axis that passes through a center of the panel and that is parallel to a planar direction of the panel.

14. An electronic device comprising:
a panel touched by a user;
a plurality of vibrators that vibrate the panel; and
a vibration controller that controls the plurality of vibrators so that when a plurality of positions of the panel are simultaneously touched by the user, a vibration at a first touch position of the plurality of touch positions is greater than a vibration of a second touch position of the plurality of touch positions, wherein:
the plurality of vibrators include a first and a second vibrator; and
where a distance between the first touch position and the first vibrator is equal to a distance between the first touch position and the second vibrator,
a transfer characteristic of vibration of the panel between the first vibrator and the first touch position is different from a transfer characteristic of vibration of the panel between the second vibrator and the first touch position,
wherein the electronic device further comprises a casing that supports the panel, and
the panel is secured to the casing in an asymmetric manner with respect to a center of the panel.

15. The electronic device according to claim 14, wherein the panel is secured to the casing in an asymmetric manner with respect to an axis that passes through a center of the panel and that is parallel to a planar direction of the panel.

16. An electronic device comprising:
a panel touched by a user;
a plurality of vibrators that vibrate the panel; and
a vibration controller that controls the plurality of vibrators so that when a plurality of positions of the panel are simultaneously touched by the user, a vibration at a first touch position of the plurality of touch positions is greater than a vibration of a second touch position of the plurality of touch positions, wherein:
the plurality of vibrators include a first and a second vibrator; and
where a distance between the first touch position and the first vibrator is equal to a distance between the first touch position and the second vibrator,
a transfer characteristic of vibration of the panel between the first vibrator and the first touch position is different from a transfer characteristic of vibration of the panel between the second vibrator and the first touch position,
wherein the electronic device further comprises a casing that supports the panel,
the panel is supported on the casing with a securing member interposed therebetween; and
a shape of the securing member is asymmetric with respect to a center of the panel.

17. The electronic device according to claim 16, wherein the panel is supported on the casing with a securing member interposed therebetween; and
the shape of the securing member is asymmetric with respect to an axis that passes through a center of the panel and that is parallel to a planar direction of the panel.

18. The electronic device according to claim 16, wherein:
where a distance between the second touch position and the first vibrator is equal to a distance between the second touch position and the second vibrator,
a transfer characteristic of vibration of the panel between the first vibrator and the second touch position is different from a transfer characteristic of vibration of the panel between the second vibrator and the second touch position.

19. An electronic device comprising:
a panel touched by a user;
a plurality of vibrators that vibrate the panel; and
a vibration controller that controls the plurality of vibrators so that when a plurality of positions of the panel are simultaneously touched by the user, a vibration at a first touch position of the plurality of touch positions is greater than a vibration of a second touch position of the plurality of touch positions, wherein:
the plurality of vibrators include a first and a second vibrator; and
where a distance between the first touch position and the first vibrator is equal to a distance between the first touch position and the second vibrator,
a transfer characteristic of vibration of the panel between the first vibrator and the first touch position is different from a transfer characteristic of vibration of the panel between the second vibrator and the first touch position,
wherein the electronic device further comprises a casing that supports the panel,
the panel is supported on the casing with a securing member interposed therebetween; and
hardness of the securing member is varied in an asymmetric manner with respect to a center of the panel.

20. The electronic device according to claim 19, wherein the panel is supported on the casing with a securing member interposed therebetween; and
hardness of the securing member is varied in an asymmetric manner with respect to an axis that passes through a center of the panel and that is parallel to a planar direction of the panel.

* * * * *